(12) United States Patent
Leonard et al.

(10) Patent No.: US 11,100,564 B2
(45) Date of Patent: *Aug. 24, 2021

(54) REGIONAL ITEM RECOMMENDATIONS

(71) Applicant: eBay Inc., San Jose, CA (US)

(72) Inventors: Cheri Nola Leonard, San Jose, CA (US); Jiri Medlen, Fullerton, CA (US); Jonathan Su, San Jose, CA (US); Mihir Naware, Redwood City, CA (US); Jatin Chhugani, Santa Clara, CA (US); Neelakantan Sundaresan, Mountain View, CA (US)

(73) Assignee: eBay Inc., San Jose, CA (US)

( * ) Notice: Subject to any disclaimer, the term of this patent is extended or adjusted under 35 U.S.C. 154(b) by 96 days.

This patent is subject to a terminal disclaimer.

(21) Appl. No.: 16/440,760

(22) Filed: Jun. 13, 2019

(65) Prior Publication Data

US 2019/0295147 A1 Sep. 26, 2019

Related U.S. Application Data

(63) Continuation of application No. 14/579,936, filed on Dec. 22, 2014, now Pat. No. 10,366,439.

(60) Provisional application No. 61/921,349, filed on Dec. 27, 2013.

(51) Int. Cl.
*G06Q 30/06* (2012.01)

(52) U.S. Cl.
CPC ..... *G06Q 30/0633* (2013.01); *G06Q 30/0601* (2013.01); *G06Q 30/0613* (2013.01); *G06Q 30/0631* (2013.01); *G06Q 30/0639* (2013.01)

(58) Field of Classification Search
CPC .......... G06Q 30/0631; G06Q 30/0639; G06Q 30/0633; G06Q 30/0613; G06Q 30/0601
USPC .................. 705/26.9, 26.7, 26.8, 26.41, 26.1
See application file for complete search history.

(56) References Cited

U.S. PATENT DOCUMENTS

| | | | |
|---|---|---|---|
| 3,823,308 A | 7/1974 | Goldberg |
| 3,852,571 A | 12/1974 | Hall et al. |
| 3,896,266 A | 7/1975 | Waterbury |
| 4,471,216 A | 9/1984 | Herve |
| 5,053,606 A | 10/1991 | Kimizu |

(Continued)

FOREIGN PATENT DOCUMENTS

| | | |
|---|---|---|
| AU | 199928111 B2 | 1/2000 |
| AU | 200197079 B2 | 6/2002 |

(Continued)

OTHER PUBLICATIONS

Non Final Office Action received for U.S. Appl. No. 16/167,867, dated Jun. 26, 2020, 25 pages.

(Continued)

*Primary Examiner* — Yogesh C Garg
(74) *Attorney, Agent, or Firm* — Shook, Hardy & Bacon L.L.P.

(57) ABSTRACT

Systems and methods for automatic generation of new listings are provided. In example embodiments, time data is received that corresponds to a destination geolocation. An indication of a purchase of an item associated with the destination geolocation is received. A return time from the destination geolocation is determined based on the time data. A new listing is automatically generated for selling the item at a time determined from the return time.

20 Claims, 13 Drawing Sheets

(56) References Cited

U.S. PATENT DOCUMENTS

| | | |
|---|---|---|
| 5,255,352 A | 10/1993 | Falk |
| 5,416,306 A | 5/1995 | Imahata |
| 5,495,568 A | 2/1996 | Beavin |
| 5,532,464 A | 7/1996 | Josephson et al. |
| 5,679,938 A | 10/1997 | Templeton et al. |
| 5,708,422 A | 1/1998 | Blonder et al. |
| 5,718,178 A | 2/1998 | Smith |
| 5,750,972 A | 5/1998 | Botvin |
| 5,770,843 A | 6/1998 | Rose et al. |
| 5,793,028 A | 8/1998 | Wagener et al. |
| 5,817,482 A | 10/1998 | Bandman et al. |
| 5,870,456 A | 2/1999 | Rogers |
| 5,883,810 A | 3/1999 | Franklin et al. |
| 5,903,878 A | 5/1999 | Talati et al. |
| 5,907,801 A | 5/1999 | Albert et al. |
| 5,907,832 A | 5/1999 | Pieterse et al. |
| 5,930,769 A | 7/1999 | Rose |
| 5,963,917 A | 10/1999 | Ogram |
| 5,987,500 A | 11/1999 | Arunachalam |
| 6,029,150 A | 2/2000 | Kravitz |
| 6,052,675 A | 4/2000 | Checchio |
| 6,175,655 B1 | 1/2001 | Georg et al. |
| 6,212,556 B1 | 4/2001 | Arunachalam |
| 6,226,624 B1 | 5/2001 | Watson et al. |
| 6,266,649 B1 | 7/2001 | Linden et al. |
| 6,310,627 B1 | 10/2001 | Sakaguchi |
| 6,415,199 B1 | 7/2002 | Liebermann |
| 6,490,534 B1 | 12/2002 | Pfister |
| 6,497,359 B1 | 12/2002 | Chihara |
| 6,546,309 B1 | 4/2003 | Gazzuolo |
| 6,643,385 B1 | 11/2003 | Bravomalo |
| 6,813,838 B2 | 11/2004 | McCormick |
| 6,836,765 B1 | 12/2004 | Sussman |
| 7,242,999 B2 | 7/2007 | Wang |
| 7,308,332 B2 | 12/2007 | Okada et al. |
| 7,328,119 B1 | 2/2008 | Pryor et al. |
| 7,354,411 B2 | 4/2008 | Perry et al. |
| 7,398,133 B2 | 7/2008 | Wannier et al. |
| 7,430,537 B2 | 9/2008 | Templeton et al. |
| 7,436,976 B2 | 10/2008 | Levy et al. |
| 7,548,794 B2 | 6/2009 | Vandergriff et al. |
| 7,574,653 B2 | 8/2009 | Croney et al. |
| 7,647,041 B2 | 1/2010 | Gonsalves et al. |
| 7,663,648 B1 | 2/2010 | Saldanha et al. |
| 7,714,912 B2 | 5/2010 | Faisman et al. |
| 8,024,260 B1 | 9/2011 | Hogl et al. |
| 8,032,943 B2 | 10/2011 | DeMello et al. |
| 8,073,740 B1 * | 12/2011 | Siegel ................ G06Q 30/0611 |
| | | 705/26.1 |
| 8,090,465 B2 | 1/2012 | Zeng |
| 8,269,778 B1 | 9/2012 | Baraff et al. |
| 8,359,247 B2 | 1/2013 | Vock |
| 8,525,828 B1 | 9/2013 | Bates |
| 8,655,053 B1 | 2/2014 | Hansen |
| 8,659,596 B2 | 2/2014 | Corazza et al. |
| 8,704,832 B2 | 4/2014 | Taylor et al. |
| 8,711,175 B2 | 4/2014 | Aarabi |
| 8,736,606 B2 | 5/2014 | Ramalingam |
| 8,738,292 B1 * | 5/2014 | Faaborg ................ G01C 21/00 |
| | | 701/537 |
| 8,749,556 B2 | 6/2014 | De Aguiar et al. |
| 8,797,328 B2 | 8/2014 | Corazza et al. |
| 8,935,611 B2 | 1/2015 | Oberbrunner et al. |
| 8,970,585 B2 | 3/2015 | Weaver |
| 9,098,813 B1 | 8/2015 | Konig et al. |
| 9,098,873 B2 | 8/2015 | Geisner et al. |
| 9,241,184 B2 | 1/2016 | Weerasinghe |
| 9,378,593 B2 | 6/2016 | Chhugani et al. |
| 9,420,319 B1 | 8/2016 | Story, Jr. et al. |
| 9,460,342 B1 | 10/2016 | Freund et al. |
| 9,465,572 B2 | 10/2016 | Yamat et al. |
| 9,691,161 B1 | 6/2017 | Yalniz et al. |
| 9,717,982 B2 | 8/2017 | Quinn et al. |
| 9,905,019 B2 | 2/2018 | Applegate et al. |
| 9,923,622 B2 | 3/2018 | Jactat et al. |
| 9,940,749 B2 | 4/2018 | Chen et al. |
| 9,953,460 B2 | 4/2018 | Chhugani et al. |
| 10,068,371 B2 | 9/2018 | Su et al. |
| 10,089,680 B2 | 10/2018 | Lin et al. |
| 10,176,515 B2 * | 1/2019 | Lutnick ............... G06Q 30/0611 |
| 10,366,439 B2 | 7/2019 | Leonard et al. |
| 2001/0023417 A1 | 9/2001 | Stefik et al. |
| 2001/0026272 A1 | 10/2001 | Feld et al. |
| 2002/0004763 A1 | 1/2002 | Lam |
| 2002/0035793 A1 | 3/2002 | Byrd |
| 2002/0077837 A1 | 6/2002 | Krueger et al. |
| 2002/0126328 A1 | 9/2002 | Lehmeier et al. |
| 2002/0174360 A1 | 11/2002 | Ikeda |
| 2003/0101105 A1 | 5/2003 | Vock |
| 2003/0139896 A1 | 7/2003 | Dietz et al. |
| 2004/0049309 A1 | 3/2004 | Gardner et al. |
| 2004/0083142 A1 | 4/2004 | Kozzinn |
| 2004/0127277 A1 | 7/2004 | Walker et al. |
| 2005/0289081 A1 | 12/2005 | Sporny |
| 2006/0020482 A1 | 1/2006 | Coulter |
| 2006/0059054 A1 | 3/2006 | Adiseshan |
| 2006/0202986 A1 | 9/2006 | Okada et al. |
| 2007/0005174 A1 | 1/2007 | Thomas |
| 2007/0124215 A1 | 5/2007 | Simmons |
| 2007/0182736 A1 | 8/2007 | Weaver |
| 2007/0199076 A1 | 8/2007 | Rensin et al. |
| 2007/0223704 A1 | 9/2007 | Brickell et al. |
| 2007/0232272 A1 | 10/2007 | Gonsalves et al. |
| 2007/0250203 A1 | 10/2007 | Yamamoto et al. |
| 2008/0022086 A1 | 1/2008 | Ho et al. |
| 2008/0140650 A1 | 6/2008 | Stackpole |
| 2008/0163344 A1 | 7/2008 | Yang |
| 2008/0201228 A1 | 8/2008 | Gillet et al. |
| 2008/0201638 A1 | 8/2008 | Nair |
| 2008/0221403 A1 | 9/2008 | Fernandez |
| 2008/0312765 A1 | 12/2008 | Gardiner et al. |
| 2008/0312998 A1 | 12/2008 | Templeton et al. |
| 2009/0002224 A1 | 1/2009 | Khatib et al. |
| 2009/0018803 A1 | 1/2009 | Ko et al. |
| 2009/0029337 A1 | 1/2009 | Nasci et al. |
| 2009/0115777 A1 | 5/2009 | Reyers |
| 2009/0144639 A1 | 6/2009 | Nims et al. |
| 2009/0193675 A1 | 8/2009 | Sieber |
| 2009/0248537 A1 | 10/2009 | Sarkeshik |
| 2009/0276300 A1 | 11/2009 | Shaw et al. |
| 2009/0287452 A1 | 11/2009 | Stanley et al. |
| 2009/0293116 A1 | 11/2009 | Demello et al. |
| 2010/0030578 A1 | 2/2010 | Siddique et al. |
| 2010/0049633 A1 | 2/2010 | Wannier et al. |
| 2010/0082360 A1 | 4/2010 | Chien et al. |
| 2010/0097395 A1 | 4/2010 | Chang et al. |
| 2010/0191770 A1 | 7/2010 | Cho et al. |
| 2010/0280920 A1 | 11/2010 | Scott et al. |
| 2010/0305909 A1 | 12/2010 | Wolper et al. |
| 2010/0306082 A1 | 12/2010 | Wolper et al. |
| 2010/0313141 A1 | 12/2010 | Yu et al. |
| 2010/0332567 A1 | 12/2010 | Samadani |
| 2011/0022372 A1 | 1/2011 | Isogai et al. |
| 2011/0022965 A1 | 1/2011 | Lawrence et al. |
| 2011/0063208 A1 | 3/2011 | Van den eerenbeemd et al. |
| 2011/0099122 A1 | 4/2011 | Bright et al. |
| 2011/0145093 A1 | 6/2011 | Paradise et al. |
| 2011/0184831 A1 | 7/2011 | Dalgleish |
| 2011/0191070 A1 | 8/2011 | Ramalingam |
| 2011/0231278 A1 | 9/2011 | Fries |
| 2011/0292034 A1 | 12/2011 | Corazza et al. |
| 2011/0298897 A1 | 12/2011 | Sareen et al. |
| 2012/0030060 A1 | 2/2012 | Lu et al. |
| 2012/0030062 A1 | 2/2012 | Stauffer et al. |
| 2012/0054059 A1 | 3/2012 | Rele |
| 2012/0078145 A1 | 3/2012 | Malhi et al. |
| 2012/0095589 A1 | 4/2012 | Vapnik |
| 2012/0233003 A1 | 9/2012 | Calman et al. |
| 2012/0259720 A1 | 10/2012 | Nuzzi |
| 2012/0281019 A1 | 11/2012 | Tamstorf et al. |
| 2012/0299912 A1 | 11/2012 | Kapur et al. |
| 2012/0308087 A1 | 12/2012 | Chao et al. |
| 2012/0309520 A1 | 12/2012 | Evertt et al. |
| 2012/0310791 A1 | 12/2012 | Weerasinghe |

(56) References Cited

U.S. PATENT DOCUMENTS

| | | |
|---|---|---|
| 2013/0024301 A1 | 1/2013 | Mikan et al. |
| 2013/0071584 A1 | 3/2013 | Bell |
| 2013/0108121 A1 | 5/2013 | De Jong |
| 2013/0110482 A1 | 5/2013 | Ellens et al. |
| 2013/0173226 A1 | 7/2013 | Reed et al. |
| 2013/0215113 A1 | 8/2013 | Corazza et al. |
| 2013/0215116 A1 | 8/2013 | Siddique et al. |
| 2013/0246222 A1 | 9/2013 | Weerasinghe |
| 2013/0254025 A1* | 9/2013 | Liu .................. G06Q 30/0255 705/14.53 |
| 2013/0258045 A1 | 10/2013 | Wojciech |
| 2013/0268399 A1 | 10/2013 | Lu et al. |
| 2013/0317944 A1 | 11/2013 | Huang et al. |
| 2014/0035913 A1 | 2/2014 | Higgins et al. |
| 2014/0040041 A1 | 2/2014 | Ohnemus et al. |
| 2014/0095348 A1 | 4/2014 | Goulart |
| 2014/0114620 A1 | 4/2014 | Grinspun et al. |
| 2014/0114884 A1 | 4/2014 | Daway |
| 2014/0129381 A1 | 5/2014 | Fries |
| 2014/0129390 A1 | 5/2014 | Mauge et al. |
| 2014/0164902 A1 | 6/2014 | Sager |
| 2014/0176565 A1 | 6/2014 | Adeyoola et al. |
| 2014/0180864 A1 | 6/2014 | Orlov et al. |
| 2014/0236703 A1* | 8/2014 | Nordstrand ........ G06Q 30/0219 705/14.38 |
| 2014/0236753 A1* | 8/2014 | Abhyanker ............. H04W 4/21 705/26.3 |
| 2014/0257993 A1 | 9/2014 | Paolini |
| 2014/0267717 A1 | 9/2014 | Pitzer et al. |
| 2014/0270540 A1 | 9/2014 | Spector et al. |
| 2014/0279200 A1 | 9/2014 | Hosein et al. |
| 2014/0279289 A1 | 9/2014 | Steermann |
| 2014/0282721 A1 | 9/2014 | Kuncl et al. |
| 2014/0313192 A1 | 10/2014 | Corazza et al. |
| 2014/0333614 A1 | 11/2014 | Black et al. |
| 2014/0368499 A1 | 12/2014 | Kaur |
| 2015/0130795 A1 | 5/2015 | Chhugani et al. |
| 2015/0134302 A1 | 5/2015 | Chhugani et al. |
| 2015/0134493 A1 | 5/2015 | Su et al. |
| 2015/0134494 A1 | 5/2015 | Su et al. |
| 2015/0134495 A1 | 5/2015 | Naware et al. |
| 2015/0134496 A1 | 5/2015 | Grinblat et al. |
| 2015/0154691 A1 | 6/2015 | Curry et al. |
| 2015/0186977 A1 | 7/2015 | Leonard et al. |
| 2015/0366504 A1 | 12/2015 | Connor |
| 2016/0029706 A1 | 2/2016 | Braverman |
| 2016/0035061 A1 | 2/2016 | Gadre et al. |
| 2016/0063588 A1 | 3/2016 | Gadre et al. |
| 2016/0088284 A1 | 3/2016 | Sareen et al. |
| 2016/0092956 A1 | 3/2016 | Su et al. |
| 2016/0117749 A1 | 4/2016 | Desmarais et al. |
| 2016/0155186 A1 | 6/2016 | Su et al. |
| 2016/0165988 A1 | 6/2016 | Glasgow et al. |
| 2016/0165989 A1 | 6/2016 | Glasgow et al. |
| 2016/0171583 A1 | 6/2016 | Glasgow et al. |
| 2016/0180447 A1 | 6/2016 | Kamalie et al. |
| 2016/0180449 A1 | 6/2016 | Naware et al. |
| 2016/0180562 A1 | 6/2016 | Naware et al. |
| 2016/0210602 A1 | 7/2016 | Siddique et al. |
| 2016/0239889 A1 | 8/2016 | Nuzzi |
| 2016/0247017 A1 | 8/2016 | Sareen et al. |
| 2016/0249699 A1 | 9/2016 | Inghirami |
| 2016/0292779 A1 | 10/2016 | Rose et al. |
| 2016/0292915 A1 | 10/2016 | Chhugani et al. |
| 2017/0004567 A1 | 1/2017 | Dutt et al. |
| 2018/0350140 A1 | 12/2018 | Su et al. |
| 2019/0057428 A1 | 2/2019 | Su et al. |

FOREIGN PATENT DOCUMENTS

| | | |
|---|---|---|
| AU | 2012240481 B2 | 8/2015 |
| AU | 2015255283 B2 | 4/2017 |
| CN | 102842089 A | 12/2012 |
| CN | 103455501 A | 12/2013 |
| CN | 103605832 A | 2/2014 |
| DE | 4425271 A1 | 1/1996 |
| DE | 19628045 A1 | 1/1998 |
| DE | 19634418 A1 | 3/1998 |
| DE | 19922150 A1 | 11/2000 |
| DE | 19926472 A1 | 12/2000 |
| DE | 10022973 A1 | 2/2001 |
| EP | 0527639 A2 | 2/1993 |
| EP | 0216521 B1 | 11/1993 |
| EP | 0519843 A3 | 2/1994 |
| EP | 0400911 B1 | 11/1996 |
| EP | 0848360 A1 | 6/1998 |
| EP | 2091015 A1 | 8/2009 |
| EP | 2187325 A1 | 5/2010 |
| IT | 2012A000628 A1 | 5/2014 |
| JP | 2004519748 A | 7/2004 |
| JP | 2008257747 A | 10/2008 |
| JP | 2010124604 A | 6/2010 |
| KR | 1020030097465 A | 12/2003 |
| KR | 1020100015465 A | 2/2010 |
| KR | 1020100053646 A | 5/2010 |
| KR | 1020100058356 A | 6/2010 |
| KR | 101606623 B1 | 3/2016 |
| KR | 101775855 B1 | 9/2017 |
| WO | 1995/006294 A1 | 3/1995 |
| WO | 1995/016971 A1 | 6/1995 |
| WO | 1996/038813 A1 | 12/1996 |
| WO | 1997/010560 A1 | 3/1997 |
| WO | 1997/013228 A1 | 4/1997 |
| WO | 1999/008242 A1 | 2/1999 |
| WO | 1999/066436 A1 | 12/1999 |
| WO | 2000/077754 A1 | 12/2000 |
| WO | 2002/005224 A2 | 1/2002 |
| WO | 2002/005224 A3 | 7/2003 |
| WO | 2010/060113 A1 | 5/2010 |
| WO | 2012/110828 A1 | 8/2012 |
| WO | 2012/138483 A1 | 10/2012 |
| WO | 2013/188908 A1 | 12/2013 |
| WO | 2014/076633 A1 | 5/2014 |
| WO | 2014/182545 A1 | 11/2014 |
| WO | 2016/106126 A1 | 6/2016 |
| WO | 2016/106193 A1 | 6/2016 |
| WO | 2016/106216 A2 | 6/2016 |
| WO | 2016/106216 A3 | 8/2016 |
| WO | 2016/160776 A1 | 10/2016 |

OTHER PUBLICATIONS

U.S. Appl. No. 14/579,936, filed Dec. 22, 2014.
Advisory Action received for U.S. Appl. No. 14/579,936, dated Sep. 12, 2018, 3 pages.
Applicant-Initiated Interview Summary received for U.S. Appl. No. 14/579,936, dated Jan. 14, 2019, 3 pages.
Applicant-Initiated Interview Summary received for U.S. Appl. No. 14/579,936, dated Aug. 15, 2018, 3 pages.
Applicant-Initiated Interview Summary received for U.S. Appl. No. 14/579,936, dated Sep. 12, 2018, 3 pages.
Final Office Action received for U.S. Appl. No. 14/579,936, dated Jun. 27, 2018, 18 pages.
Final Office Action received for U.S. Appl. No. 14/579,936, dated Jul. 10, 2017, 25 pages.
Non-Final Office Action received for U.S. Appl. No. 14/579,936, dated Jan. 8, 2018, 15 pages.
Non-Final Office Action received for U.S. Appl. No. 14/579,936, dated Mar. 24, 2017, 36 pages.
Non-Final Office Action received for U.S. Appl. No. 14/579,936, dated Oct. 25, 2018, 21 pages.
Notice of Allowability received for U.S. Appl. No. 14/579,936, dated Apr. 9, 2019, 6 pages.
Notice of Allowance received for U.S. Appl. No. 14/579,936, dated Mar. 15, 2019, 9 pages.
Response to Advisory Action filed on Sep. 27, 2018, for U.S. Appl. No. 14/579,936, dated Sep. 12, 2018, 22 pages.
Response to Final Office Action filed on Aug. 27, 2018, for U.S. Appl. No. 14/579,936, dated Jun. 27, 2018, 20 pages.

(56) References Cited

OTHER PUBLICATIONS

Response to Final Office Action filed on Dec. 1, 2017, for U.S. Appl. No. 14/579,936, dated Jul. 10, 2017, 16 pages.
Response to Non-Final Office Action filed on Jan. 25, 2019, for U.S. Appl. No. 14/579,936, dated Oct. 25, 2018, 20 pages.
Response to Non Final Office Action filed on May 31, 2017, for U.S. Appl. No. 14/579,936, dated Mar. 24, 2017, 19 pages.
Response to Non-Final Office Action filed on Apr. 4, 2018, for U.S. Appl. No. 14/579,936, dated Jan. 8, 2018, 29 pages.
Automated Clearing House Rules, "A Complete Guide to Rules and Regulations Governing the ACH Network", The National Autorned Clearing House Association, 1999, 627 pages.
Harwood et al., "The Use of the Kawabata Evaluation System For Product Development And Quality Control", Journal of the Society of Dyers and Colourists, vol. 106, No. 2, Feb. 1990, pp. 64-68.
Horne, "Letter from Gowling Lafleur Henderson LLP to Park, Vaughan and Fleming LLP", Jul. 21, 2004, 3 pages.
Jassim, "Semi-Optimal Edge Detector based on Simple Standard Deviation with Adjusted Thresholding", International Journal of Computer Applications 68, No. 2, Apr. 2013, pp. 43-48.
McDonnell et al., "Pipeline for Populating Games with Realistic Crowds", Int. J. Intell Games & Simulation 4, No. 2, Oct. 31, 2018, 1-15 pp.
Oregon, "ACH Debit Electronic Funds Transfer: Program Guide", Retrieved from the Internet URL: <http://www.dor.state.or.us/19forms/206-029.pdf>, Feb. 1999, 8 pages.
Telstra Corporation Ltd, "In the Matter of Australian Application Serial No. 2001271968, in the name of PayPal, Inc-and-In the Matter of Opposition to the Application by Telstra Corporation Limited" "Statement of Grounds of Opposition and Particulars Relating to Each Ground", Sep. 17, 2007, 1-8 pp.
Applicant-Initiated Interview Summary received for U.S. Appl. No. 14/503,309, dated Mar. 20, 2018, 3 pages.
Non-Compliant Notice for U.S. Appl. No. 14/503,309, dated Dec. 21, 2017, 6 pages.
Non-Final Office Action received for U.S. Appl. No. 14/503,309, dated May 23, 2018, 14 pages.
Response to Non-Compliant Amendment filed on Apr. 18, 2018, for U.S. Appl. No. 14/503,309, dated Dec. 21, 2017, 10 pages.
Response to Restriction Requirement filed on Nov. 13, 2017, for U.S. Appl. No. 14/503,309, dated Sep. 13, 2017, 10 pages.
Restriction Requirement received for U.S. Appl. No. 14/503,309, dated Sep. 13, 2017, 7 pages.
A World Away, "Selena Mell Sends Home Her First Impressions Of A New Life In The United Arab Emirates", Community, Nov. 25, 2011, 3 pages.
Basenese, "Virtual Fitting Rooms . . . Coming to a Store Near You", Retrieved from the Internet URL :<https://www.wallstreetdaily.com/2011/07/07/virtual-fitting-rooms-fits-me/>, Aug. 13, 2014, 2 pages.
Binkley, "The Goal: A Perfect First-Time Fit: True Fit Is Online Retailers Latest Attempt to Help Consumers Buy Right Size; No Tape Measures", Retrieved from the Internet URL: <http://online.wsj.cominewslarticies/SB10001424052702304724404577293593210807790#printMode>, Mar. 23, 2012, 4 pages.
Bossard et al., "Apparel Classification with Style", Retrieved from the Internet URL :<http://www.vision.ee.ethz.ch/~lbossard/bossard_accv12_apparel-classification-with-style.pdf>, 2012, pp. 1-14.
Bryant, "Fits.me Launches Robot to Help Women Size Up Clothes Online", Retrieved from the Internet URL : <https://thenextweb.com/eu/2011/06/10/fits-me-launches-robot-to-help-women-size-up-clothes-online/#. tnw_BRXPLr8L>, Jun. 10, 2011, 4 pages.
Chang, "Virtual Dressing Rooms Hanging the Shape of Clothes Shopping", Retrieved from the Internet URL: <https://phys.org/news/2012-07-virtual-rooms.html>, Jul. 23, 2012, 3 pages.
Chang, "Virtual Fitting Rooms Changing the Clothes Shopping Experience", Retrieved from the Internet URL :<http://articles.latimes.com/2012/jul/13/business/la-fi-virtual-dressing-room-20120714>, Jul. 13, 2012, 2 pages.
Cheng et al., "A 3D Virtual Show Room for Online Apparel Retail Shop", In Proceedings: APSIPA ASC 2009: Asia-Pacific Signal and Information Processing Association, Annual Summit and Conference, Retrieved from the Internet URL :< http://www.apsipa.org>, Oct. 4-7, 2009, pp. 193-199.
Criminisi et al., "Single View Metrology", International Journal of Computer Vision, vol. 40, Issue 2, 2000, pp. 123-148.
Feng et al., "A Deformation Transformer for Real-Time Cloth Animation", Retrieved from the Internet URL :<http://i.cs.hku.hk/~yzyu/publication/dtcloth-sig2010.pdf>, Jul. 2010, pp. 1-8.
Fuhrmann et al., "Interaction-Free Dressing of Virtual Humans", Computers & Graphics 27, No. 1, 2003, pp. 71-82.
Gioberto, "Garment-Integrated Wearable Sensing for Knee Joint Monitoring", Proceedings of the 2014 ACM International Symposium on Wearable Computers: Adjunct Program, Sep. 13-17, 2014, pp. 113-118.
Gioberto et al., "Overlock-Stitched Stretch Sensors: Characterization and Effect of Fabric Property", Journal of Textile and Apparel, Technology and Management, vol. 8, Issue 3, 2013, 14 pages.
Hughes et al., "Physical Simulation for Animation and Visual Effects: Parallelization and Characterization for Chip Multiprocessors", In ACM SIGARCH Computer Architecture News, vol. 35, No. 2, May 2007, 12 pages.
Jojic et al., "A Framework for Garment Shopping over the Internet", 2000, 22 pages.
Karsch et al., "Rendering Synthetic Objects into Legacy Photographs", ACM Transactions on Graphics (TOG). vol. 30, No. 6, 2011, 12 pages.
Krashinsky, "Vector-Thread Architecture and Implementation", Retrieved from the Internet URL :<http://scale.eecs.berkeley.edu/papers/krashinsky-phd.pdf>, May 25, 2007, pp. 1-186.
Kristensen et al., "Towards a Next Generation Universally Accessible 'Online Shopping-for-Apparel' System", Retrieved from the Internet URL :<http://vbn.aau.dk/files/78490156/VDR_paper_from_HCII2013_V03_LNCS8006_978_3_642_39264_1.pdf>, 2013, pp. 418-427.
Li et al., "Wearable Sensors in Intelligent Clothing for Measuring Human Body Temperature Based on Optical Fiber Bragg Grating", Retrieved from the Internet URL: <http://ro.uow.edu.au/eispapers/298>, Optics Express, vol. 20, Issue 11, May 9, 2012, pp. 11740-11752.
Lim et al., "Characterization of Noise in Digital Photographs for Image Processing", Retrieved from the Internet URL : <https://www.spiedigitallibrary.org/conference-proceedings-of-spie/6069/60690O/Characterization-of-noise-in-digital-photographs-for-image-processing/10.1117/12.655915.short>, Feb. 10, 2006, 11 pages.
Luo et al., "Reactive 2D/3D Garment Pattern Design Modification", Computer-Aided Design, vol. 37, No. 6, May 2005, pp. 623-630.
Niceinteractive, "Virtual Dressing Room", Retrieved from the Internet URL: <https://www.youtube.com/watch?v=UhOzN2z3wtl>, Sep. 3, 2012, 2 pages.
O'Brien, "Fits.me—Imitates Ladies of All Shapes and Sixes, Tries Clothes on for you (video)", Retrieved from the Internet URL: <https://www.engadget.com/2011/06/13/fits-me-imitates-ladies-of-all-shapes-and-sizes-tries-clothes-o/>, Accessed on Aug. 13, 2014, 10 pages.
Okreylos, "3D Video Capture with Three Kinects", Retrieved from the Internet URL: <https://www.youtube.com/watch?v=Ghgbycqb92c>, May 13, 2014, 3 pages.
Photoshop, "Placing An Image Inside of Another With Photoshop CS6", Retrieved from the Internet URL: <http://www.photoshopessentials.com/photo-effects/placing-an-image-inside-another-with-photoshop-cs6/>, Sep. 9, 2014, 8 pages.
Rudolph et al., "A Simple Load Balancing Scheme for Task Allocation in Parallel Machines", Retrieved from the Internet URL: <http://people.csail.mit.edu/rudolph/Autobiography/LoadBalancing.pdf>, 1991, pp. 237-245.
Satish et al., "IEEE Xplore Abstact—Can Traditional Programming Bridge the Ninja Performance Gap for Parallel computing applications?",39th Annual ISCA, Retrieved from the Internet URL: <http://ieeexplore.ieee.org/xpl/articleDetails.jsp?reload=true&arnumbe-r=6237038> 2012, 12 pages.

(56) References Cited

OTHER PUBLICATIONS

Selle et al., "Robust High-Resolution Cloth Using Parallelism, History-Based Collisions and Accurate Friction", IEEE Transactions on Visualization and Computer Graphics, vol. 15, No. 2, Mar.-Apr. 2009, pp. 339-350.

Styku, "Styku Startup Revolutionizes Apparel Shopping, Reduces Returns with Virtual Fitting Room", Retrieved from the Internet URL :<file:///C:/Users/swadhwa/Downloads/Styku_Kinect_CaseStudy%20(1).pdf>, Nov. 6, 2012, 7 pages.

Yang et al., "Detailed Garment Recovery from a Single-View Image", Retrieved from the Internet URL :<https://arxiv.org/pdf/1608.01250.pdf>, 2016, pp. 1-13.

"02Micro Inc Files Taiwan Patent Application for Method and Device for Electronic Fitting," Global IP News, Electronics Patent News, Dec. 26, 2013, 1 Page.

Final Office Action Received for U.S. Appl. No. 16/167,867, dated Nov. 9, 2020, 33 Pages.

Response to Non-Final Office Action filed on Sep. 28, 2020 for U.S. Appl. No. 16/167,867, dated Jun. 26, 2020, 17 pages.

Notice Of Allowance received for U.S. Appl. No. 16/167,867, dated Feb. 26, 2021, 11 Pages.

\* cited by examiner

REGIONAL ITEM RECOMMENDATIONS

RELATED APPLICATIONS

This application is a continuation of U.S. patent application Ser. No. 14/579,936, filed Dec. 22, 2014, which claims the benefit of U.S. Provisional Application No. 61/921,349, filed Dec. 27, 2013. Each of the aforementioned applications is hereby incorporated by reference in its entirety.

TECHNICAL FIELD

Embodiments of the present disclosure relate generally to computer technology and, more particularly, but not by way of limitation, to regional item recommendations.

BACKGROUND

Many regions of the world have unique environments, styles, and customs. Local residents typically wear apparel adapted to the region in which they reside. Visitors from other regions can stand out as non-congruent with local style or can be ill equipped to deal with the region's environment.

BRIEF DESCRIPTION OF THE DRAWINGS

Various ones of the appended drawings merely illustrate example embodiments of the present disclosure and should not be considered as limiting its scope.

Figure 1:
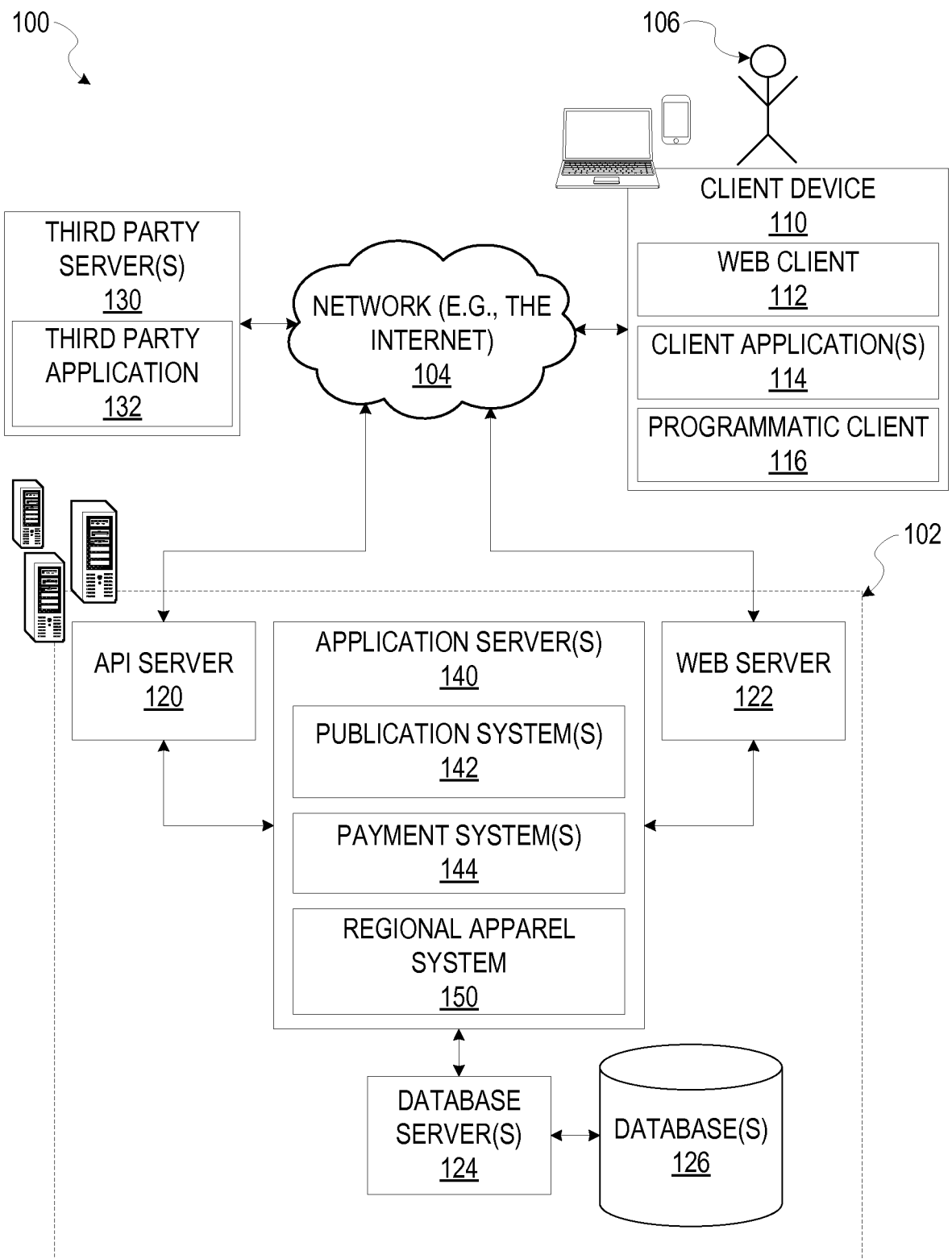
FIG. 1 is a block diagram of a networked system, according to some example embodiments.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In various example embodiments, systems and methods for providing regional item recommendations are provided. In an example embodiment, an application server receives a destination geolocation. The destination geolocation can be a specific location, a city, a region, a country, and the like. In further embodiments, the application server receives activities or an indication of an activity along with the destination geolocation from the user (e.g., clubbing, site seeing, skiing, and so forth).

Subsequently, the application server retrieves data associated with the destination from a plurality of sources. In an example embodiment, the application server retrieves the destination data from social network servers, government servers, web camera servers, commercial servers, and so forth. The destination data can include images, data associated with the images, social network data, purchase history data associated with the destination geolocation, population demographic information, climate information, weather forecast information, and so forth.

The application server extracts a destination characteristic from the destination data. The destination characteristic indicates an affinity score (e.g., a metric or rating indicating a likelihood or probability that a particular person of the destination geolocation desires or has demand for a particular item) for apparel associated with the destination geolocation. For example, the destination characteristic can indicate that a particular style or cut of jeans are popular in an area surrounding the destination geolocation.

The application server then determines a candidate apparel item based on the extracted destination characteristic. The candidate apparel item, for instance, can be clothing that conforms to social norms of the area around the destination geolocation or apparel that is suited for the area around the destination geolocation (e.g., winter clothing for cold regions).

The application server identifies an item listing corresponding to the candidate apparel item from an online marketplace application server. The application server can recommend the item listing to the user, for example, by causing presentation of the item listing on a user interface of the user device.

In further embodiments, the application server retrieves user data corresponding to the user from the plurality of sources (e.g., social network servers, user input into a user interface, online marketplace servers). The user data can include user demographic information (e.g., age, gender, income level), purchase histories, prior destinations of the user, social network data (e.g., posts to a social network and social network contacts including data associated with the contact), and other data. In some embodiments, the user data can also include sensor data indicating user apparel item usage. In these embodiments, the sensor data includes tag detections indicating use, by the user, of a particular apparel item. For example, the sensor data include tag detections such as RFID tag detections (e.g., a RFID tag embedded in an article of clothing), smart tag detections (e.g., near field communication (NFC) tags), or Quick Response (QR) code detections. In some embodiments, the application server extracts a user characteristic from the user data and uses the user characteristic, in part, to determine the candidate apparel item.

In some embodiments, the application server provides the user various options associated with the item listing. In an example embodiment, the options include an option to deliver a purchased item of the item listing to the destination geolocation. In a further embodiment, the options include an option to automatically list the purchased item of the item listing for sale on an online marketplace at a determined date, such as upon the user leaving the destination.

In a specific example, the application server receives a destination geolocation such as Playa Azul beach in Cozumel, Mexico. The application server retrieves destination data associated with Mexico, Cozumel, Playa Azul beach, the region surrounding Cozumel, and the region surrounding Playa Azul beach. The destination data may indicate that the destination is a beach in a warm climate. Based on an analysis of the destination data in this example, the application server retrieves item listings of beachwear items that are recommended to the user for purchase. The user may have provided an activity or the destination data may have indicated an activity associated with the destination, for example, snorkeling. Based on the activity provided by the user or indicated in the destination data, listings of snorkeling equipment items may be retrieved from the application server and may be included in the candidate items. The application server may also retrieve user data that indicates the user is a woman. Based on the user data and the destination data, item listings of beachwear suits for women may be retrieved from the application server and included in the candidate items. In further embodiments of this example, the destination data associated with the user data and the destination data may be retrieved. For example, the application server can retrieve, and cause presentation to the user, data from social network profiles of people located near the destination geolocation that have similar demographic characteristics to the user. In this example, the application server can retrieve pictures of woman (demographically similar to the user) that live near Cozumel and present them to the user to assist the user in evaluating the item listings for purchase (e.g., evaluating a style of locals near Cozumel to better fit in when visiting Cozumel). In still further embodiments of this example, the user data may indicate, for example, that the user has already purchased goggles but does not have a snorkel. Based on the user data, goggles may not be included and snorkels may be included in the item listings.

With reference to FIG. 1, an example embodiment of a high-level client-server-based network architecture 100 is shown. A networked system 102 provides server-side functionality via a network 104 (e.g., the Internet or wide area network (WAN)) to a client device 110. In some implementations, a user (e.g., user 106) interacts with the networked system 102 using the client device 110. FIG. 1 illustrates, for example, a web client 112 (e.g., a browser, such as the INTERNET EXPLORER® browser developed by MICROSOFT® Corporation of Redmond, Wash. State), client application(s) 114, and a programmatic client 116 executing on the client device 110. The client device 110 includes the web client 112, the client application(s) 114, and the programmatic client 116 alone, together, or in any suitable combination. Although FIG. 1 shows one client device 110, in other implementations, the network architecture 100 comprises multiple client devices.

In various implementations, the client device 110 comprises a computing device that includes at least a display and communication capabilities that provide access to the networked system 102 via the network 104. The client device 110 comprises, but is not limited to, a remote device, work station, computer, general purpose computer, Internet appliance, hand-held device, wireless device, portable device, wearable computer, cellular or mobile phone, Personal Digital Assistant (PDA), smart phone, tablet, ultrabook, netbook, laptop, desktop, multi-processor system, microprocessor-based or programmable consumer electronic, game consoles, set-top box, network Personal Computer (PC), mini-computer, and so forth. In an example embodiment, the client device 110 comprises one or more of a touch screen, accelerometer, gyroscope, biometric sensor, camera, microphone, Global Positioning System (GPS) device, and the like.

The client device 110 communicates with the network 104 via a wired or wireless connection. For example, one or more portions of the network 104 comprises an ad hoc network, an intranet, an extranet, a Virtual Private Network (VPN), a Local Area Network (LAN), a wireless LAN (WLAN), a Wide Area Network (WAN), a wireless WAN (WWAN), a Metropolitan Area Network (MAN), a portion of the Internet, a portion of the Public Switched Telephone Network (PSTN), a cellular telephone network, a wireless network, a Wireless Fidelity (WI-FI®)) network, a Worldwide Interoperability for Microwave Access (WiMax) network, another type of network, or any suitable combination thereof.

In some example embodiments, the client device 110 includes one or more of the applications (also referred to as "apps") such as, but not limited to, web browsers, book reader apps (operable to read e-books), media apps (operable to present various media forms including audio and video), fitness apps, biometric monitoring apps, messaging apps, electronic mail (email) apps, and e-commerce site apps (also referred to as "marketplace apps"). In some implementations, the client application(s) 114 include various components operable to present information to the user and communicate with networked system 102. In some embodiments, if the e-commerce site application is included in the client device 110, then this application is configured to locally provide the user interface and at least some of the functionalities with the application configured to communicate with the networked system 102, on an as needed basis, for data or processing capabilities not locally available (e.g., access to a database of items available for sale, to authenticate a user, to verify a method of payment). Conversely, if the e-commerce site application is not included in the client device 110, the client device 110 can use its web browser to access the e-commerce site (or a variant thereof) hosted on the networked system 102.

The web client 112 accesses the various systems of the networked system 102 via the web interface supported by a web server 122. Similarly, the programmatic client 116 and client application(s) 114 accesses the various services and functions provided by the networked system 102 via the programmatic interface provided by an Application Program Interface (API) server 120. The programmatic client 116 can, for example, be a seller application (e.g., the Turbo Lister application developed by EBAY® Inc., of San Jose, Calif.) to enable sellers to author and manage listings on the networked system 102 in an off-line manner, and to perform batch-mode communications between the programmatic client 116 and the networked system 102.

Users (e.g., the user 106) comprise a person, a machine, or other means of interacting with the client device 110. In some example embodiments, the user is not part of the network architecture 100, but interacts with the network architecture 100 via the client device 110 or another means. For instance, the user provides input (e.g., touch screen input or alphanumeric input) to the client device 110 and the input is communicated to the networked system 102 via the network 104. In this instance, the networked system 102, in response to receiving the input from the user, communicates information to the client device 110 via the network 104 to be presented to the user. In this way, the user can interact with the networked system 102 using the client device 110.

The API server 120 and the web server 122 are coupled to, and provide programmatic and web interfaces respectively to, one or more application server(s) 140. The application server(s) 140 can host one or more publication system(s) 142, payment system(s) 144, and a regional apparel system 150, each of which comprises one or more modules or applications and each of which can be embodied as hardware, software, firmware, or any combination thereof. The application server(s) 140 are, in turn, shown to be coupled to one or more database server(s) 124 that facilitate access to one or more information storage repositories or database(s) 126. In an example embodiment, the database(s) 126 are storage devices that store information to be posted (e.g., publications or listings) to the publication system(s) 142. The database(s) 126 also stores digital good information in accordance with some example embodiments.

Additionally, a third party application 132, executing on third party server(s) 130, is shown as having programmatic access to the networked system 102 via the programmatic interface provided by the API server 120. For example, the third party application 132, utilizing information retrieved from the networked system 102, supports one or more features or functions on a website hosted by the third party. The third party website, for example, provides one or more promotional, marketplace, or payment functions that are supported by the relevant applications of the networked system 102.

The publication system(s) 142 provides a number of publication functions and services to the users that access the networked system 102. The payment system(s) 144 likewise provides a number of functions to perform or facilitate payments and transactions. While the publication system(s) 142 and payment system(s) 144 are shown in FIG. 1 to both form part of the networked system 102, it will be appreciated that, in alternative embodiments, each system 142 and 144 may form part of a payment service that is separate and distinct from the networked system 102. In some example embodiments, the payment system(s) 144 may form part of the publication system(s) 142.

In some implementations, the regional apparel system 150 provides functionality to identify and recommend apparel items associated with a particular a geolocation. In some example embodiments, the regional apparel system 150 communicates with the client device 110, the third party server(s) 130, the publication system(s) 142 (e.g., retrieving listings), and the payment system(s) 144 (e.g., purchasing a listing). In an alternative example embodiment, the regional apparel system 150 is a part of the publication system(s) 142. The regional apparel system 150 will be discussed further in connection with FIG. 2 below.

Further, while the client-server-based network architecture 100 shown in FIG. 1 employs a client-server architecture, the present inventive subject matter is, of course, not limited to such an architecture, and can equally well find application in a distributed, or peer-to-peer, architecture system, for example. The various systems of the applications server(s) 140 (e.g., the publication system(s) 142 and the payment system(s) 144) can also be implemented as stand-alone software programs, which do not necessarily have networking capabilities.

Figure 2:
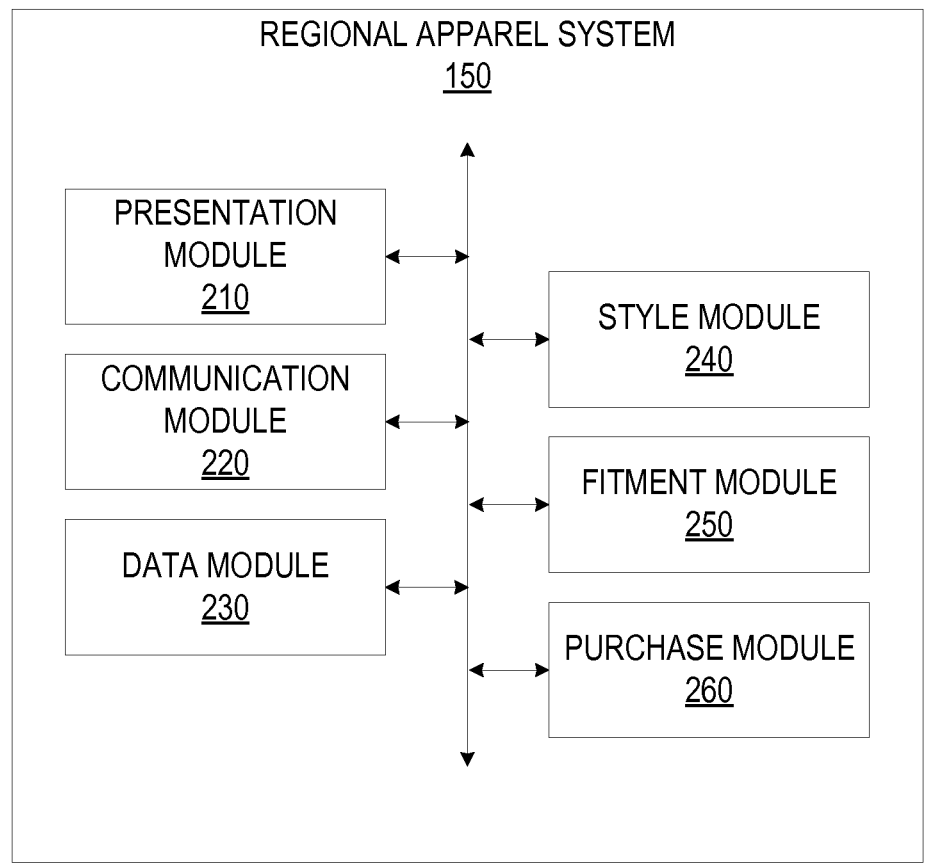
FIG. 2 is a block diagram illustrating an example embodiment of a regional apparel system, according to some example embodiments.

FIG. 2 is a block diagram of the regional apparel system 150 that provides functionality to identify and recommend apparel associated with a particular geolocation, according to some example embodiments. In an example embodiment, the regional apparel system 150 includes a presentation module 210, a communication module 220, a data module 230, a style module 240, a fitment module 250, and a purchase module 260. All, or some, of the modules 210-260 of FIG. 2 communicate with each other, for example, via a network coupling, shared memory, and the like. Consistent with some embodiments, the modules 210-260 are specially configured to facilitate or perform functionality described herein. It will be appreciated that each module can be implemented as a single module, combined into other modules, or further subdivided into multiple modules. Other modules not pertinent to example embodiments can also be included, but are not shown.

The presentation module 210 provides various presentation and user interface functionality operable to interactively present (or cause presentation) and receive information from the user. For instance, the presentation module 210 can cause presentation of the item listings along with various images and data associated with the item listings (e.g., price, description, images, availability date, currency, dimensions, weight, or condition). In other instances, the presentation module 210 generates and causes presentation of user interfaces to recommend item listings, present social media information (e.g., images and postings), present inventory data of the user, and so forth. In various implementations, the presentation module 210 presents or causes presentation of information (e.g., visually displaying information on a screen, acoustic output, haptic feedback). Interactively presenting information is intended to include the exchange of information between a particular device and the user. The user may provide input to interact with the user interface in many possible manners such as alphanumeric, point based (e.g., cursor), tactile, or other input (e.g., touch screen, tactile sensor, light sensor, infrared sensor, biometric sensor, microphone, gyroscope, accelerometer, or other sensors), and the like. It will be appreciated that the presentation module 210 provides many other user interfaces to facilitate functionality described herein. Further, it will be appreciated that "presenting," as used herein, is intended to include communicating information or instructions to a particular device that is operable to perform presentation based on the communicated information or instructions.

The communication module 220 provides various communications functionality and web services. For example, the communication module 220 provides network communication such as communicating with the networked system 102, the client device 110, and the third party server(s) 130. In various example embodiments, the network communication can operate over wired or wireless modalities. Web services are intended to include retrieving information from the third party server(s) 130, the database(s) 126, and the application server(s) 140. In some implementations, information retrieved by the communication module 220 comprises data associated with the user (e.g., user profile information from an online account, social network service data associated with the user), data associated with one or more items listed on an e-commerce website (e.g., images of the item, reviews of the item, item price), or other data to facilitate the functionality described herein.

The data module 230 provides functionality to access or retrieve data from a variety of sources. For instance, the data module 230 can retrieve destination data and user data from the databases 126, the third party servers 130, the client device 110, and other sources. In various specific examples, the data module 230 accesses or retrieves the destination data and the user data from social networking severs (e.g., posts, likes, follows, friends, or check-ins) and online market place servers (e.g., current item listings, purchase histories, and account settings). The destination data includes, for example, images (e.g., images with a geotag within a distance of the destination geolocation), social media data (e.g., posts of member of the social network near the destination geolocation), climate information, weather forecast data, purchase histories of other users, and so forth. The user data includes, for example, demographic data (e.g., age, gender, socio-economic status), geolocation data (e.g., as determined by a Global Positioning System (GPS) component of a mobile device of the user), social media data (e.g., posts, likes, follows, or check-ins of the user), a purchase history of the user, and so on.

The style module 240 provides functionality to determine candidate apparel items (e.g., suggested or recommended items for the user) based on various analyses using various data. For example, the style module 240 extracts the destination characteristic and the user characteristic respectively from the destination data and the user data. Characteristics, as used herein, are intended to include traits, qualities, actions, activities, attitudes, habits, behaviors, and the like pertaining to a person or a geolocation as is suitable. The style module 240 can perform other analyses such as identifying social networking service profiles of members that are similar to the user (e.g., similar demographics).

The fitment module 250 provides functionality to determine garment or apparel sizes of the user and identify and recommend item listings based on the determine apparel size of the user. For instance, the fitment module 250 can analyze a purchase history of the user to determine a user apparel size of the user. The fitment module 250 can then analyze purchase histories of other users to determine, estimate, or gauge an appropriate or candidate garment or apparel size for a particular item listing (e.g., other users that are of a same or similar size as the user frequently purchased a particular piece of apparel in a particular size).

The purchase module 260 provides functionality to facilitate purchase of an item corresponding to an item listing. In some embodiments, the purchase module 260 provides functionality to identify delivery options for the purchase. In further embodiments, the purchase module 260 generates an option for automatic sale for an item of an item listing according to various pieces of data. For example, the user may be planning a ski trip and the purchase module 260 can facilitate purchase of items for the ski trip, have the purchased items delivered to the ski trip destination, and provide the user with an option to automatically list the items for sale when the ski trip is over.

Figure 3:
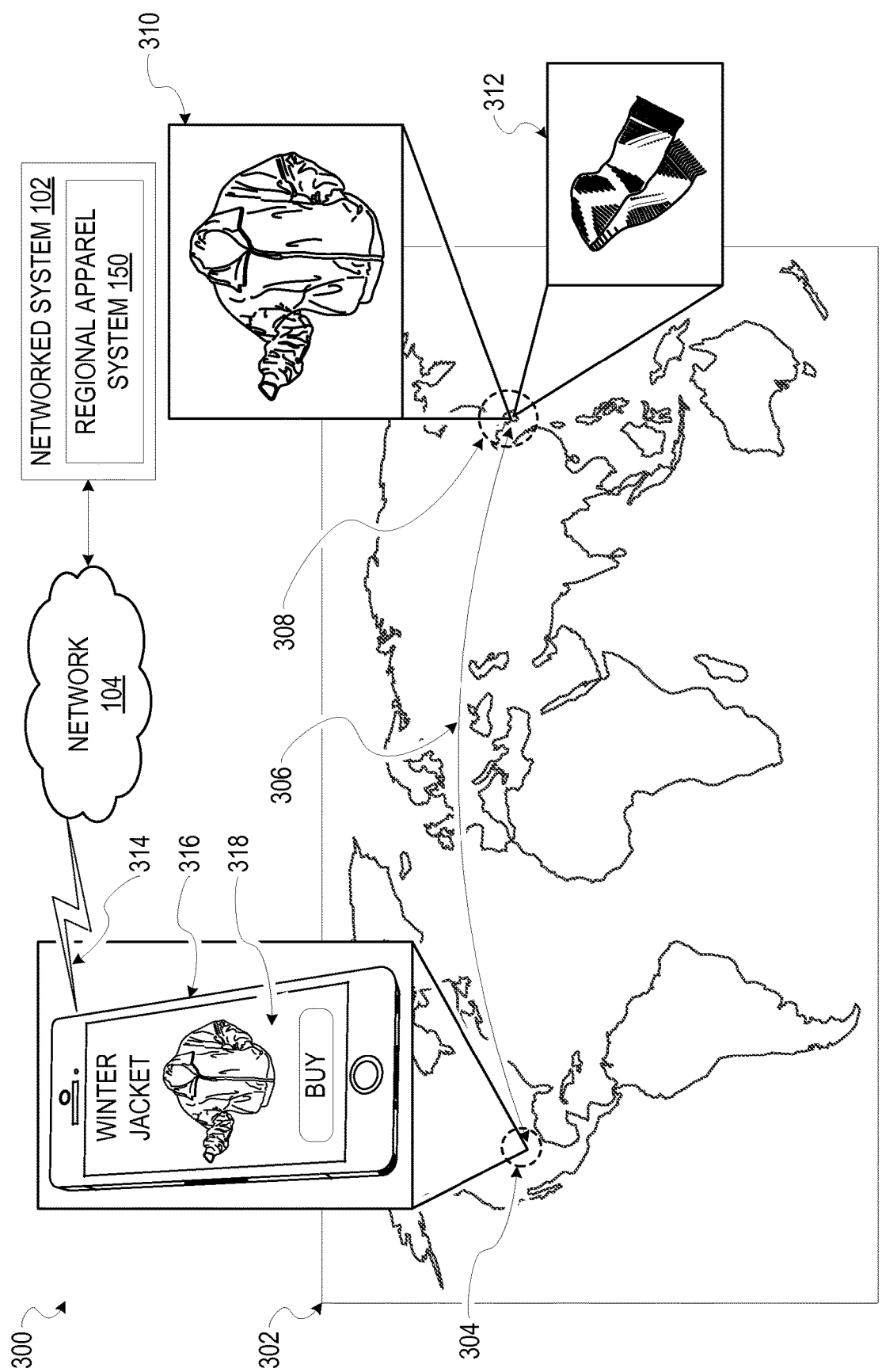
FIG. 3 is a diagram illustrating an example of regional item recommendations, according to some example embodiments.

FIG. 3 is a diagram 300 illustrating an example of regional item recommendations. In the diagram 300, a map 302 shows different regions, countries, and geolocations of the world. Geolocation 304 is a geolocation of a user and the line 306 indicates that the user at the geolocation 304 is interested or may travel to geolocation 308. Items 310 and 312 show particular pieces of apparel, such as a jacket and a scarf, associated with the geolocation 308. In an example, the items 310 and 312 are associated with the geolocation 308 by corresponding to a social norm of the geolocation 308 (e.g., popular among residents in a vicinity of the geolocation 308), being manufactured at the geolocation 308, being associated with activities at the geolocation 308 (e.g., ski related equipment for a particular geolocation associated with skiing), and so forth. That is to say, the items 310 and 312 have a relationship with the geolocation 308. The relationship can pertain to social norms or other cultural aspects of the geolocation 308. User device 316 is a particular device of the user (e.g., a smart phone or computer) that may be at the geolocation 304. The user device 316 is communicatively coupled to the network 104 and the regional apparel system 150 via a communication link 314, allowing for an exchange of data between the regional apparel system 150 and the user device 316. In the diagram 300, the user device 316 is displaying a user interface 318 that can include item listings for purchase by the user (e.g., item listings retrieved from an online website).

In a specific example, the user is at the geolocation 304 and is interested in traveling to the geolocation 308 (the destination geolocation) for a skiing trip. In this example, the geolocation 308 is in a different country than the geolocation 304. The user device 316 of the user provides an indication of the geolocation 308 to the regional apparel system 150. For example, the user may input the geolocation 308 at a user interface configured to receive a destination geolocation. Subsequently, the regional apparel system 150 retrieves destination data corresponding to the geolocation 308. The destination data can include a wide range of data indicating various social norms, activities, popular apparel, and so forth, associated with the geolocation 308. For example, the destination data includes purchase histories of user that reside within a distance of the geolocation 308. The regional apparel system 150 extracts a destination characteristic from the destination data. The destination characteristic indicates an affinity or preference for certain apparel associated with the geolocation 308. For example, residents within a distance of the geolocation 308 that purchase ski equipment also purchase a particular brand of jeans. The regional apparel system 150 then determines a candidate apparel item based on the extracted destination characteristic. The regional apparel system 150 identifies item listings corresponding to the candidate apparel item and causes presentation of the identified item listings on the user interface 318 of the user device 316. In this way, the regional apparel system 150 recommends the items 310 to the user based on the geolocation 308. The item listings may be culturally appropriate, popular in the region, or otherwise suited to the geolocation 308.

Figure 4:
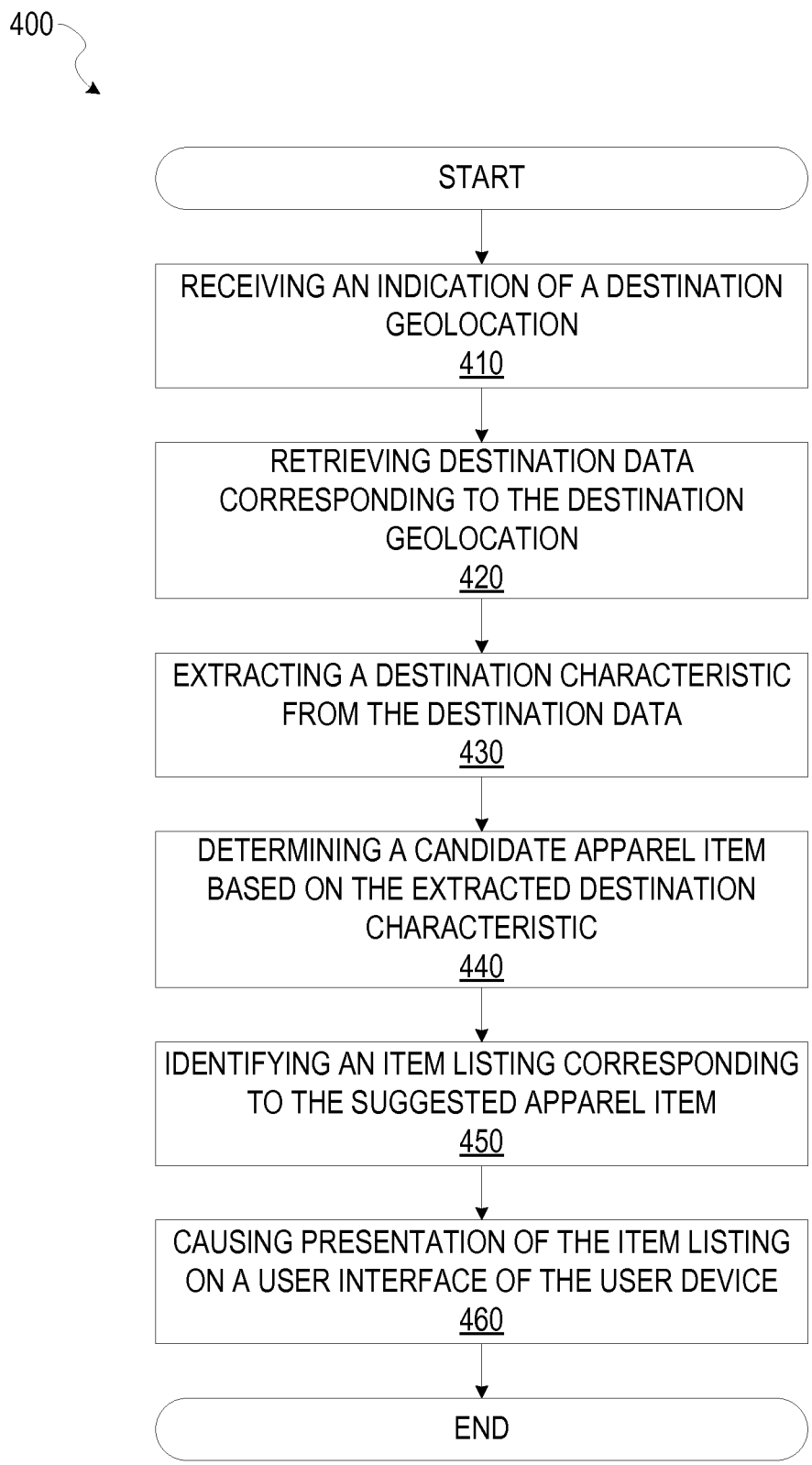
FIG. 4 is a flow diagram illustrating an example method for providing regional item recommendations, according to some example embodiments.

FIG. 4 is a flow diagram illustrating an example method 400 for providing regional item recommendations. The operations of the method 400 may be performed by components of the regional apparel system 150, and are so described below, for the purposes of illustration.

At operation 410, the communication module 220 receives an indication of a destination geolocation from a user device of a user. For example, the user can input an indication of the destination geolocation (e.g., the geolocation 308) into a user interface configured to receive the destination geolocation. In other examples, the regional apparel system 150 infers the destination geolocation based on user activity such as performing searches associated with a particular geolocation.

At operation 420, the data module 230 retrieves or accesses the destination data corresponding to the destination geolocation. The data module 230 retrieves or accesses the destination data from a wide variety of sources such as social network servers, government servers, online marketplace servers, the user device, and so on. The destination data includes, for example, images (e.g., images with a geotag near the destination geolocation), social media data (e.g., posts of member of the social network near the destination geolocation), climate information, weather forecast data, purchase histories of other users (e.g., purchases from online marketplaces), search histories (e.g., search histories originating from near the destination geolocation and associated with apparel), and so forth. The destination data can be associated with the destination geolocation, an area surrounding the destination geolocation, a region surrounding the destination geolocation, a specific location near the destination geolocation, and so on.

At operation 430, the style module 240 extracts a destination characteristic from the destination data. The destination characteristic indicates an affinity score or rating (e.g., a metric indicating a likelihood or probability that a particular person associated with the destination geolocation desires or has demand for a particular item) for apparel associated with the destination geolocation. For instance, if the destination characteristic indicates the destination geolocation is in a warm climate, then the destination characteristic may indicate a high affinity score for apparel or garments suited for a warm climate (e.g., as determined by a portion of a population of the destination geolocation that purchases such apparel as compared to other populations). In another example, the destination characteristic indicates a particular activity associated with the destination geolocation (e.g., prolific ski slopes near the destination geolocation) and consequently indicates an affinity or preference for apparel associated with the particular activity. In yet another example, the destination characteristic indicates popularity of a particular piece of apparel based on trends indicated by social media data included in the destination data (e.g., numerous social media posts associated with a particular piece of apparel for users near the destination geolocation or a spike in purchases for a particular piece of apparel near the destination geolocation). In still another example, the destination characteristic indicates a particular piece of apparel is popular among residents near the destination geolocation according to purchases made by residents within a distance of the destination geolocation. In other examples, the destination characteristic indicates an affinity score for at least one of a color, pattern, design, style, or type of apparel. In an example, the destination characteristic indicates that a particular feature of a garment (e.g., button style or placement on a garment) is popular in an area surrounding the destination geolocation.

At operation 440, the style module 240 determines a candidate apparel item based on the extracted destination characteristic. The candidate apparel item can comprise equipment (e.g., skiing equipment), items for activities (e.g., concert tickets), medicine (e.g., motion sickness medicine for certain activities such as a theme park visit), clothing, garments, and so forth. In a specific example, if the user is planning a business trip to a particular foreign nation that has particular social norms for business attire, the style module 240 determines candidate apparel according to the destination characteristic that indicates a particular social norm for business attire.

At operation 450, the data module 230 identifies an item listing corresponding to the candidate apparel item. For instance, the data module 230 performs a search or a lookup for item listings on an online marketplace server for item listings that are associated with the candidate apparel item (e.g., item listings for items that are the same or similar to the candidate item). For instance, if the candidate apparel item is a pair of jeans with a particular cut and style, the data module 230 identifies item listings for items of the same or similar jeans with the particular cut and style.

At operation 460, the presentation module 210 causes presentation of the item listing on a user interface of the user device. As discussed further in connection with FIG. 5 below, the presentation module 210 can generate a user interface that include various data corresponding to the item listing and various options (e.g., purchasing the item of the item listing).

Figure 5:
FIG. 5 is a user interface diagram depicting an example user interface showing item listings, according to some example embodiments.

FIG. 5 is a user interface diagram 500 depicting an example user interface 510 showing item listings 530. Although user interfaces described herein (e.g., FIGS. 5, 7, 9, 11, 13, and 17) depict specific example user interfaces and user interface elements, these are merely non-limiting examples, and many other alternate user interfaces and user interface elements can be generated by the presentation module 210 and presented to the user. It will be noted that alternate presentations of the displays described herein include additional information, graphics, options, and so forth; other presentations include less information, or provide abridged information for easy use by the user.

In the user interface diagram 500, user interface element 520 provides an option to sort the item listings 530, or otherwise navigate the item listings 530, according to various schemes such as sorting based on recentness (e.g., based on temporal information corresponding to respective item listings 530), item price, distance from the user, relevance, geolocation, fitment (e.g., how well a particular piece of apparel may fit the user), style (how well a particular piece of apparel conforms to a style of the user or a region), or other metrics. In an example embodiment, the item listings 530 include various portions of item information such as an item image, price, merchant, brand, or other information retrieved from the publication system(s) 142. In some implementations, activating a particular item listing presents additional information corresponding to the particular item listing. In an example embodiment, the user interface 510 includes an option to purchase the item corresponding to the item listing 530 (e.g., activating a particular user interface element facilitates a transaction for the item, for example, using the payment system(s) 144).

Figure 6:
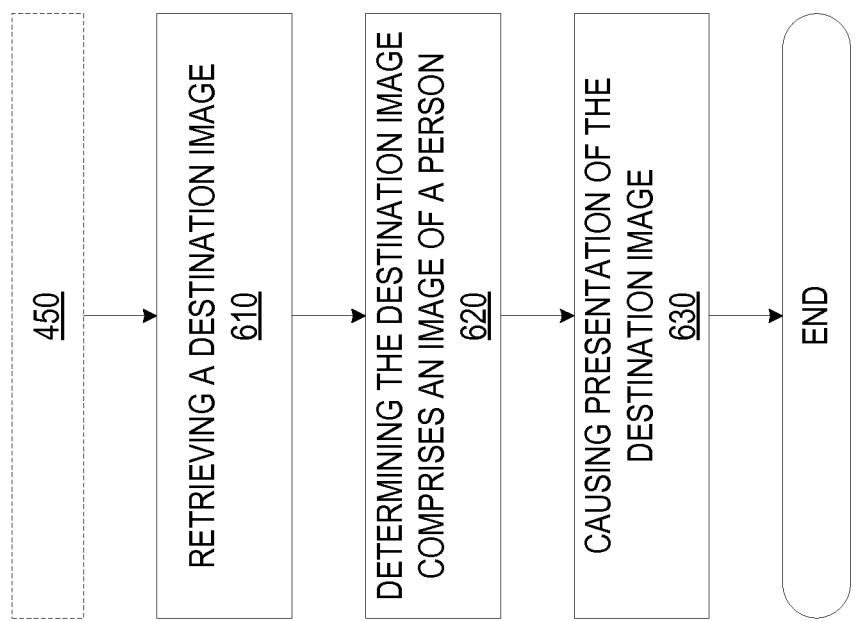
FIG. 6 is a flow diagram illustrating further operations of the method for providing regional item recommendations, according to some example embodiments.

FIG. 6 is a flow diagram illustrating further operations of the method for providing regional item recommendations. After the data module 230 identifies the item listing at the operation 450, the additional example operations of FIG. 6 are performed, in some example embodiments.

At operation 610, the data module 230 retrieves a destination image associated with the destination geolocation. For instance, the data module 230 can perform a web search for images associated with the destination geolocation (e.g., an image with a description that mentions the destination geolocation or an image with a geotag near the destination geolocation).

At operation 620, the style module 240 determines the destination image comprises an image of a person associated with the destination geolocation. For instance, the style module 240 uses image recognition techniques to determine that the destination image includes a person (e.g., detecting a face within an image as a proxy for determining the image includes a person). In other instances, the style module 240 uses metadata associated with a particular image to determine that the image comprise a person (e.g., an image that includes tags corresponding to members of a particular social network service). In some embodiments, the style module 240 determines that the destination image is associated with a particular piece of apparel or particular activity (e.g., images of people wearing winter clothing or going skiing).

At operation 630, the presentation module 210 causes presentation of the destination image on the user interface of the user device to assist the user in evaluation a style of the item listing. For instance, the destination images can provide insight into local styles and customs associated with the destination geolocation.

Figure 7:
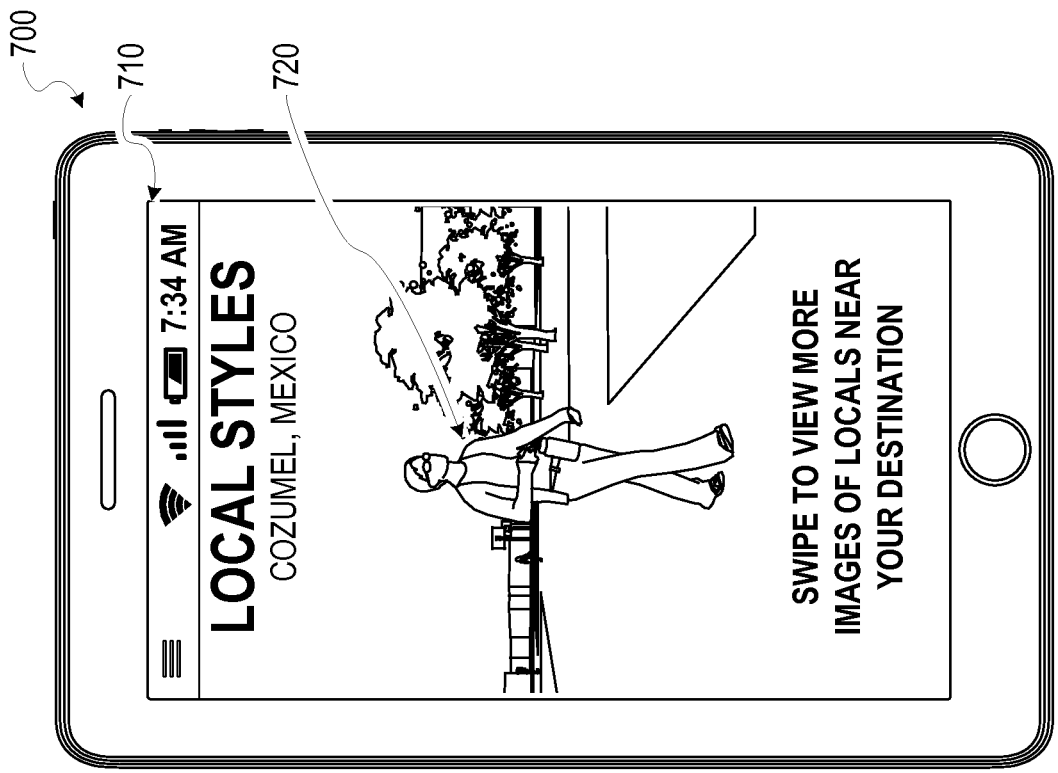
FIG. 7 is a user interface diagram depicting an example user interface showing an image of a person associated with a region, according to some example embodiments.

FIG. 7 is a user interface diagram 700 depicting an example user interface 710 showing an image of a person 720 associated with the destination geolocation. In various embodiments, the presentation module 210 can cause presentation of a plurality of images of people that the user can navigate to evaluate a style of the destination geolocation.

Figure 8:
FIG. 8 is a flow diagram illustrating further operations of the method for providing regional item recommendations, according to some example embodiments.

FIG. 8 is a flow diagram illustrating further operations of the method for providing regional item recommendations. After the data module 230 identifies the item listing at the operation 450, the additional example operations of FIG. 8 are performed, in some example embodiments.

At operation 810, the style module 240 identifies a similar profile among a plurality of member profiles of a social network service. The similar profile corresponds to a member of the social network service that is similar to the user. For example, the style module 240 may identifies a similar profile of a member having the same or similar demographical information as the user (e.g., same age or gender).

At operation 820, the style module 240 determines the similar profile includes member geolocation data indicating the member of the similar profile resides within a distance of the destination geolocation. For instance, the similar profile may indicate that the member of the similar profile resides at a geolocation within a distance of the destination geolocation.

At operation 830, the data module 230 accesses the member image included in the similar profile. The member image being an image of the member of the similar profile.

At operation 840, the presentation module 210 causes presentation of the member image on a user interface of the user device. In some instances, the style module 240 ranks or sorts a plurality of member images by date, similarity to the user, type of apparel associated with the member image, and causes presentation of a highest ranking member image (e.g., a recent member image of a member that is most similar to the user).

Figure 9:
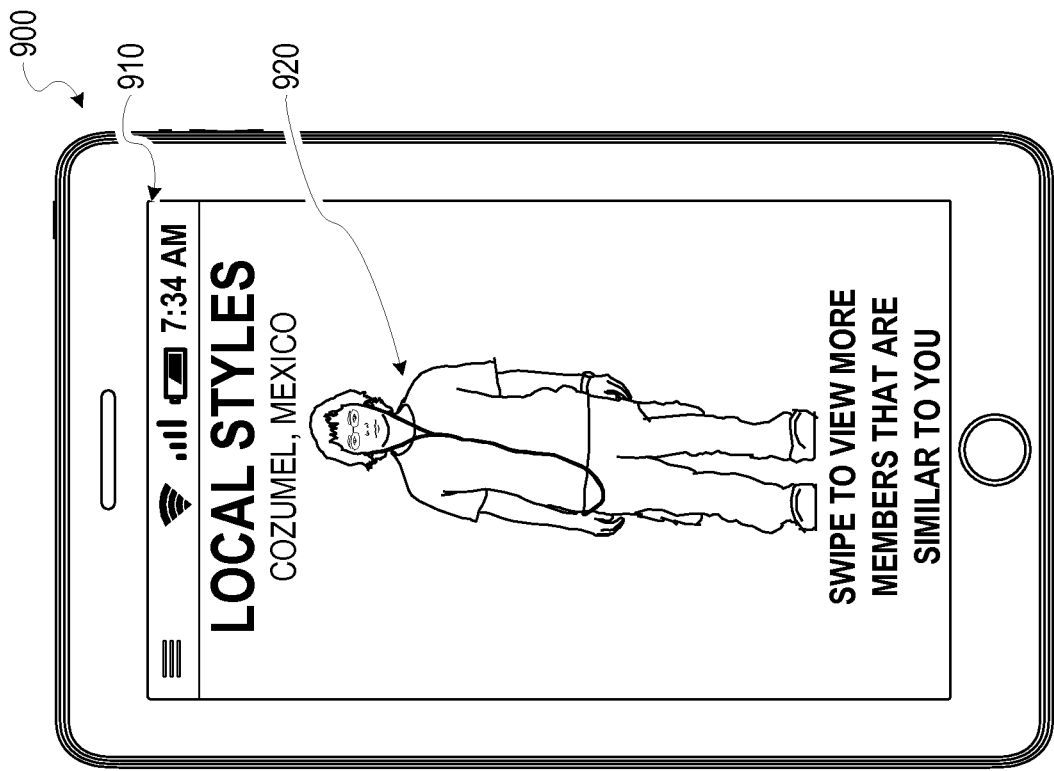
FIG. 9 is a user interface diagram depicting an example user interface showing a member profile image, from a social network service, of a person associated with a region, according to some example embodiments.

FIG. 9 is a user interface diagram 900 depicting an example user interface 910 showing a member profile image 920, from a social network service, of a person associated with the destination geolocation. In an example, the member profile image 920 may be a member of a social network service that resides at a geolocation near the destination geolocation and is wearing apparel associated with the item listing.

Figure 10:
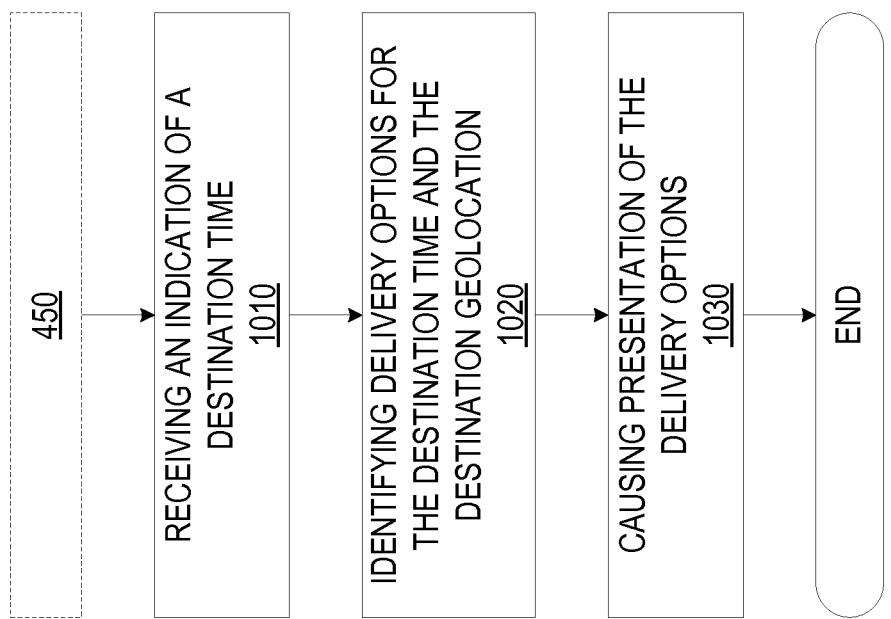
FIG. 10 is a flow diagram illustrating further operations of the method for providing regional item recommendations, according to some example embodiments.

FIG. 10 is a flow diagram illustrating further operations of the method for providing regional item recommendations. After the data module 230 identifies the item listing at the operation 450, the additional example operations of FIG. 10 are performed, in some example embodiments.

At operation 1010, the communication module 220 receives an indication of a destination time or time range of the user. The destination time comprises a time when the user plans to be in a vicinity of the destination geolocation. In an example, the communication module 220 can receive the indication of the destination time from a user input of the destination time. In another example, the style module 240 infers the destination time based on various data associated with the user. For instance, if a user purchase history indicates an airline ticket for specified dates, the style module 240 can infer the destination time from the purchase history.

In further embodiments, the data module 230 uses the destination time to retrieve the destination data. For example, given the destination time that is in summer, the data module 230 may retrieve the destination data including date associated with summer time (e.g., summer clothing).

At operation 1020, the purchase module 260 identifies a delivery option for the item listing. The delivery option includes delivery parameters according to the destination geolocation and the destination time. For example, if the user is going on vacation and has provided the destination geolocation for the vacation, it may be more convenient for the user to simply have vacation items delivered to the vacation destination. In some embodiments, purchase module 260 provides a number of delivery choices for the item listing to the user. The delivery choices can include delivering the items on a particular date, a particular type of delivery (e.g., 24 hour courier), a method of delivery (e.g., delivery to the front desk of a hotel with instructions to be delivered to a room on a date), and other delivery choices. In further embodiments, a dynamic delivery choice may be provided to the user. The dynamic delivery choice may locate the user at the destination to make the delivery with or without location information provided by the user. For example, the user may provide a particular city as the destination. The dynamic delivery choice may then attempt to locate the user within the city. The user may be found by GPS on a mobile device, for example. The dynamic delivery may have a default delivery location if the user cannot be located (e.g., the user's home or a specific location near the destination).

At operation 1030, the purchase module 260 causes presentation of the delivery option with the delivery parameters on the user interface of the user device. The user can indicate a selection of a particular delivery option and the purchase module 260 can facilitate delivery of the item of the item listing according to the delivery parameters of the selected delivery option.

Figure 11:
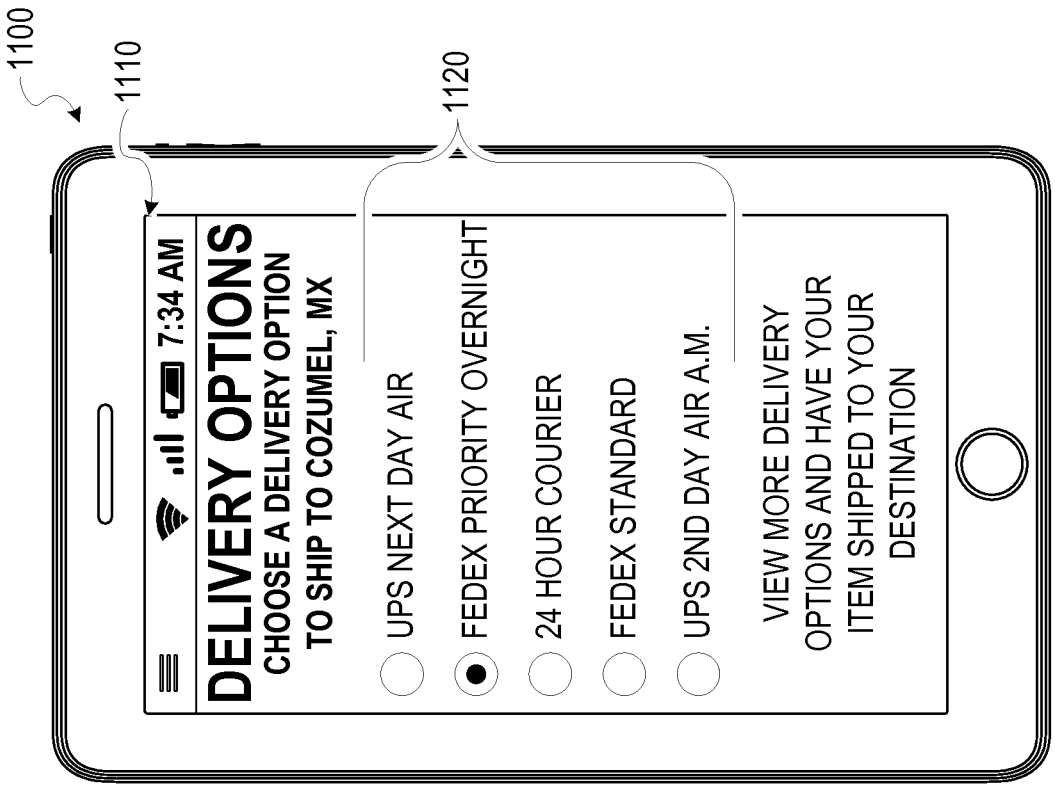
FIG. 11 is a user interface diagram depicting an example user interface showing delivery options for an item listing, according to some example embodiments.

FIG. 11 is a user interface diagram 1100 depicting an example user interface 1110 showing delivery options 1120 for the item listing. As shown in the example user interface 1110, the user provided an indication of a selection of a particular delivery option.

Figure 12:
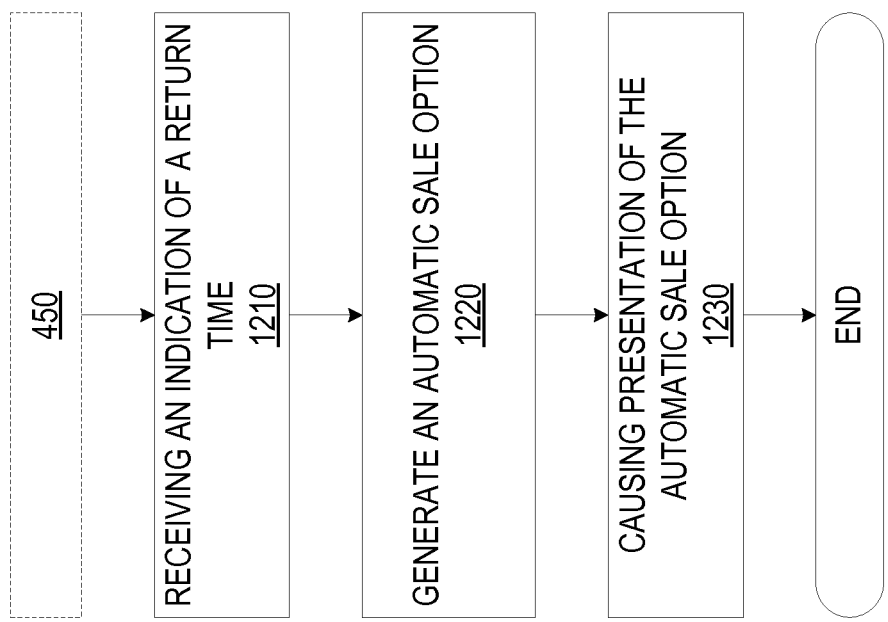
FIG. 12 is a flow diagram illustrating further operations of the method for providing regional item recommendations, according to some example embodiments.

FIG. 12 is a flow diagram illustrating further operations of the method for providing regional item recommendations. After the data module 230 identifies the item listing at the operation 450, the additional example operations of FIG. 12 are performed, in some example embodiments.

At operation 1210, the communication module 220 receives an indication of a return time or time range of the user. The return time comprises a time when the user plans to leave a vicinity of the destination geolocation. For example, the user can input a return time into a user interface configured to receive the return time. In another example, the style module 240 infers the return time based on various data such as date indicated by an airline ticket.

At operation 1220, the purchase module 260 generates an automatic sale option for the item listing according to the destination geolocation and the return item. The automatic sale option specifies instructions to automatically list an apparel item of the item listing for sale on behalf of the user. For example, if the user is going on vacation and purchases the items in the item listings specifically for the vacation and the items are no longer needed after the vacation, it may be convenient to automatically list those items for sale after or during the vacation. In some embodiments, the user may provide a date of sale and the items may be listed to the online marketplace on a date corresponding to the date of sale.

At operation 1230, the presentation module 210 causes presentation of the automatic sale option on the user interface of the user device. The user can provide an indication of a selection of the automatic sale option. In response to the communication module 220 receiving the selection of the automatic sale option, the purchase module 260 can schedule a listing of the purchased item for sale at a date in the future (e.g., a time at or after the return time). The purchase module 260 can automatically generate the listing (e.g., images and description) using information from the original item listing the user purchased.

Figure 13:
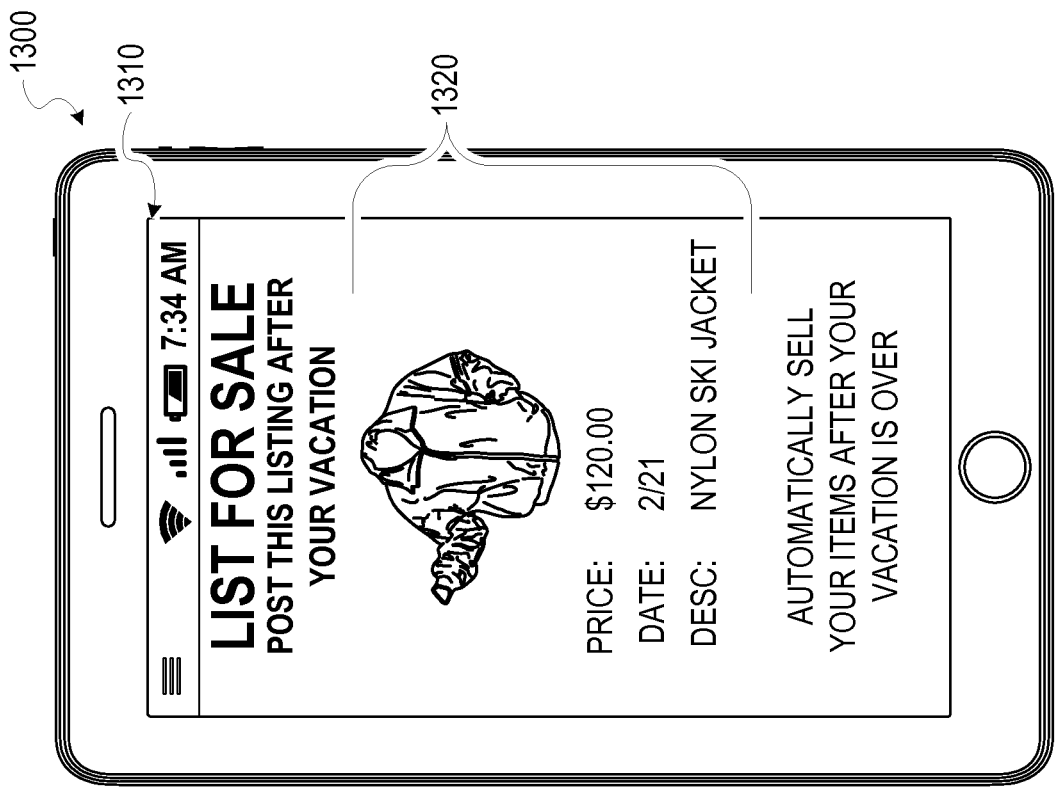
FIG. 13 is a user interface diagram depicting an example user interface showing listing an item for sale, according to some example embodiments.

FIG. 13 is a user interface diagram 1300 depicting an example user interface 1310 showing listing an item for sale 1320. The item for sale includes various data associated with the item such as an image, price, and description.

Figure 14:
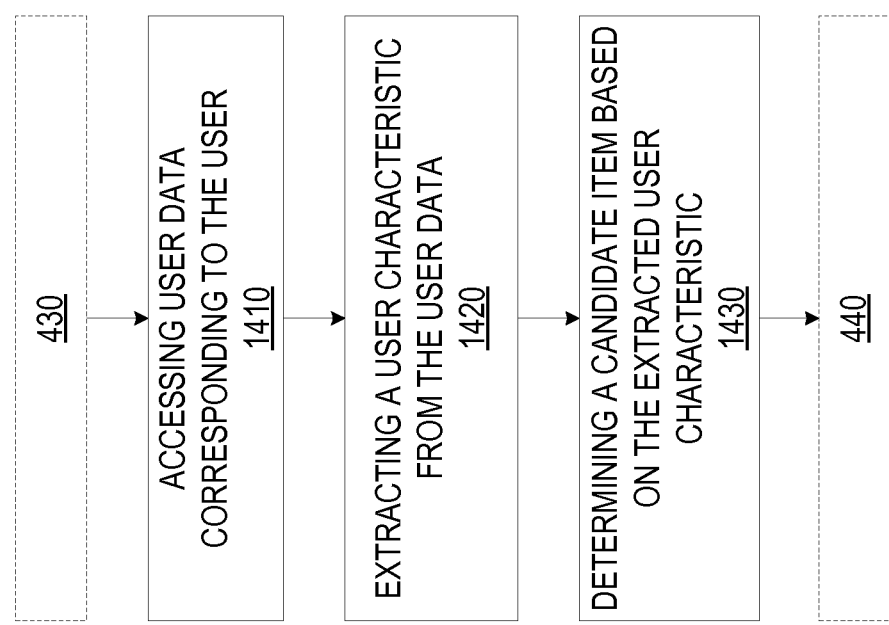
FIG. 14 is a flow diagram illustrating further operations of the method for providing regional item recommendations, according to some example embodiments.

FIG. 14 is a flow diagram illustrating further operations of the method for providing regional item recommendations. After the style module 240 extracts the destination characteristic at the operation 430, the additional example operations of FIG. 14 are performed, in some example embodiments.

At operation 1410, the data module 230 accesses user data corresponding to the user. The user data can include user demographic information (e.g., age, gender, income level), purchase histories, prior destinations of the user (e.g., as determined by stored data from a GPS component of a mobile device of the user), social network data (e.g., posts to a social network and social network contacts including data associated with the contact), and other data. The user data can also include sensor data indicating user apparel item usage. The sensor data includes tag detections indicating use, by the user, of a particular apparel item. For example, the sensor data include tag detections such as RFID tag detections (e.g., a RFID tag embedded in an article of clothing), smart tag detections (e.g., near field communication (NFC) tags), or bar code (e.g., a QR code) detections.

At operation 1420, the style module 240 extracts a user characteristic from the user data. The user characteristic indicates a user affinity score or rating (e.g., a probability or likelihood that the user desires or has demand for a particular item) for apparel associated with the user. For example, if the user has often purchased items in a particular color or brand, the user characteristic may indicate a higher user affinity score for apparel in that color or brand. In another example, the style module 240 can extract a particular user characteristic that indicates a purpose or reason for a visit to the destination geolocation (e.g., a skiing trip or a business trip). In this example, the particular user characteristic can be indicative of a particular type of apparel (e.g., business attire for a business trip).

At operation 1430, the style module 240 determines the candidate item based on the extracted user characteristic and the extracted destination characteristic. For instance, the style module 240 can determine a candidate item based on the user's age, past purchases, recent usage patterns (e.g., wearing a particular style of clothing more often in recent weeks), or other user characteristics.

Figure 15:
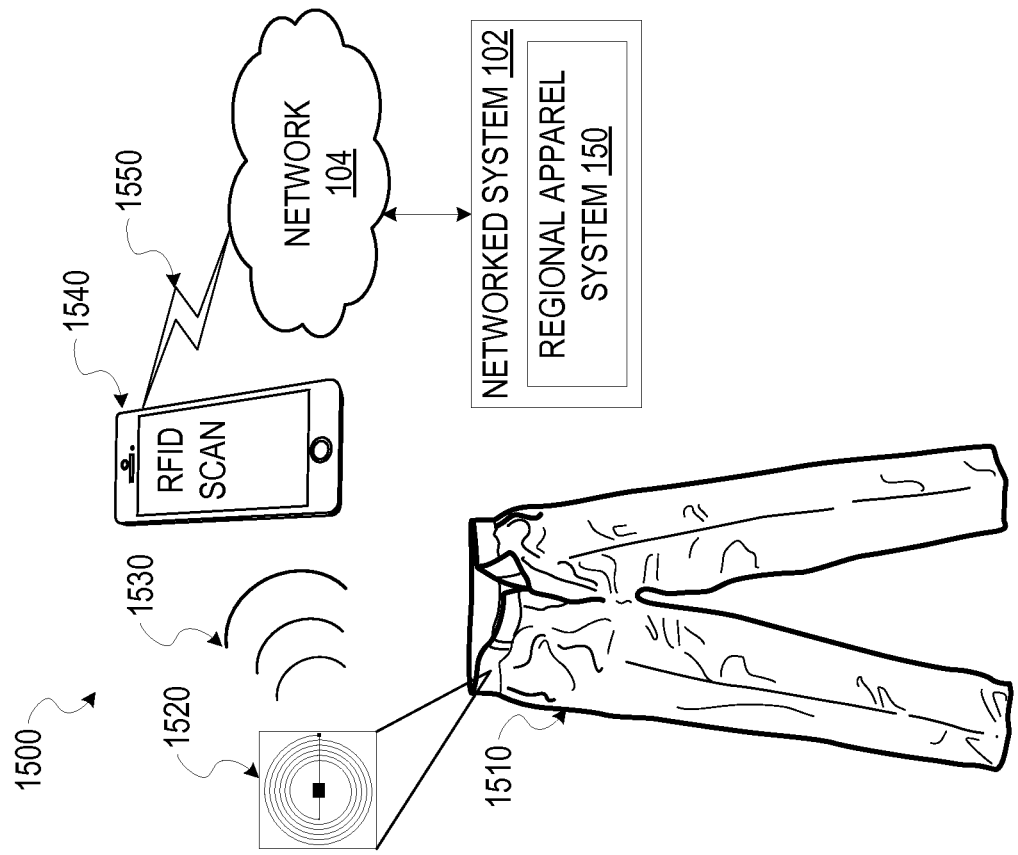
FIG. 15 is a diagram depicting receiving sensor data indicative of apparel inventory usage, according to some example embodiments.

FIG. 15 is a diagram 1500 depicting receiving sensor data indicative of apparel inventory usage. User apparel 1510 may include an embedded RFID tag 1520 (or another type of identification mechanism such as QR code) that is detectable via a signal 1530 at a device 1540. The device 1540 is communicatively coupled to the network 104 and the regional apparel system 150 via a communication link 1550, allowing for an exchange of data between the regional apparel system 150 and the device 1540. In the diagram 1500, the device 1540 may be a mobile phone of the user that can automatically detect the RFID tag 1520 when in proximity to the user apparel 1510. The device 1540 can communicate detections of the RFID tag 1520 to the regional apparel system 150. Such detections may indicate apparel usage patterns or trends of the user and user inventory. In other emblements, the user can provide inventory data to a user interface configured to receive inventory data. The user data can include the inventory data and the style module 240 can analyze the inventory data to determine a base style of the user. From the base style, the style module 240 can determine the candidate apparel item in conjunction with the destination geolocation.

Figure 16:
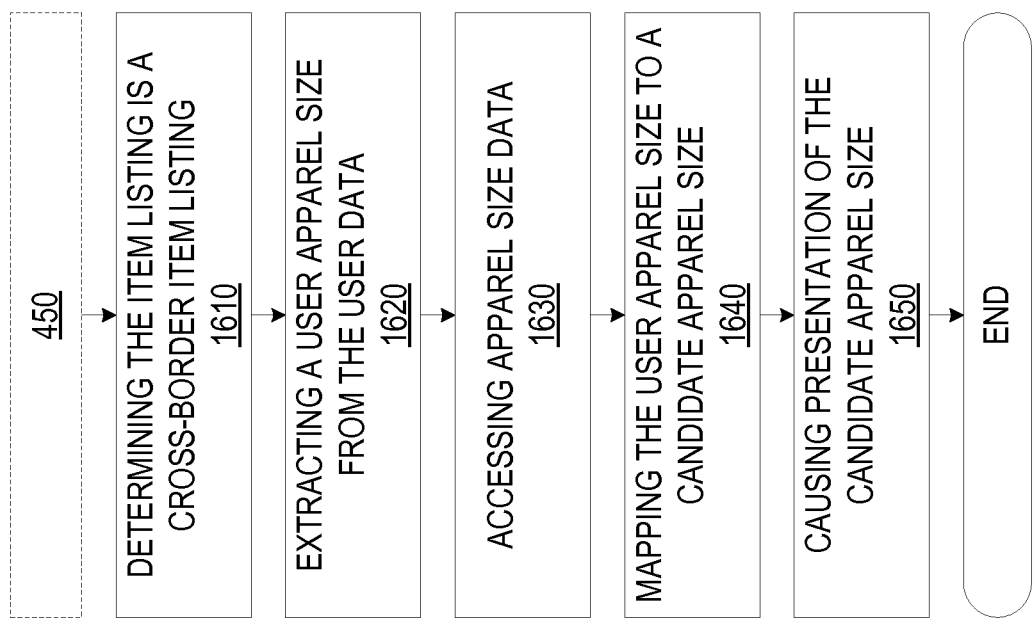
FIG. 16 is a flow diagram illustrating further operations of the method for providing regional item recommendations, according to some example embodiments.

FIG. 16 is a flow diagram illustrating further operations of the method for providing regional item recommendations. After the data module 230 identifies the item listing at the operation 450, the additional example operations of FIG. 16 are performed, in some example embodiments.

At operation 1610, the fitment module 250 determines the item listing comprises a cross-border item listing based on a user geolocation indicated by the user data and an item listing geolocation indicated by the item listing. In a cross-border item listing, the user geolocation can be in a different country than the geolocation indication by the item listing. In such cross-border item listings, sizes of apparel can deviate from an expectation of the user (e.g., a user location in the United States may have a different expectation for a size large than a user located in Japan). To better provide recommendations to the user, the fitment module 250 can translate sizes of the user to sizes associated with a particular piece of apparel.

At operation 1620, the fitment module 250 extracts a user apparel size from the user data. For instance, the purchase history or inventory data of the user can indicate a garment size the user typically purchases for various types of apparel.

At operation 1630, the data module 230 accesses apparel size data corresponding to the cross-border item listing. For example, the data module 230 can access purchase histories of other users that are of a similar physical size to the user and that have purchased a same or similar item corresponding to the cross-border item listing. For example, the fitment module 250 identifies other users of a same physical size by comparing the purchase histories of the user and the other users and finding a match in garment size for particular pieces of apparel (e.g., buying a particular brand and style of jeans in a same length and waist size). Once the fitment module 250 identifies other users of a same or similar physical size to the user, the data module 230 can then identify users among the other users that have purchased the item corresponding to the cross-border item listing.

At operation 1640, the fitment module 250 maps the user apparel size to a candidate apparel size for the cross-border item listing using the apparel size data. For instance, the fitment module 250 determines that the other users, that are of a same or similar physical size as compared to the user, often purchase the item of the cross-border item listing in a particular size. Using such a determination, the fitment module 250 can map the user apparel size to the candidate apparel size.

At operation 1650, the presentation module 210 causes presentation of the cross-border item listing including the candidate apparel size that maps to the user apparel size. For instance, the presentation module 210 can cause presentation of a most frequently purchased size of the item corresponding to the cross-border item listing for users that are of a same or similar physical size as the user. In this way, the regional apparel system 150 can translate apparel sizes for apparel that is from another country or region.

Figure 17:
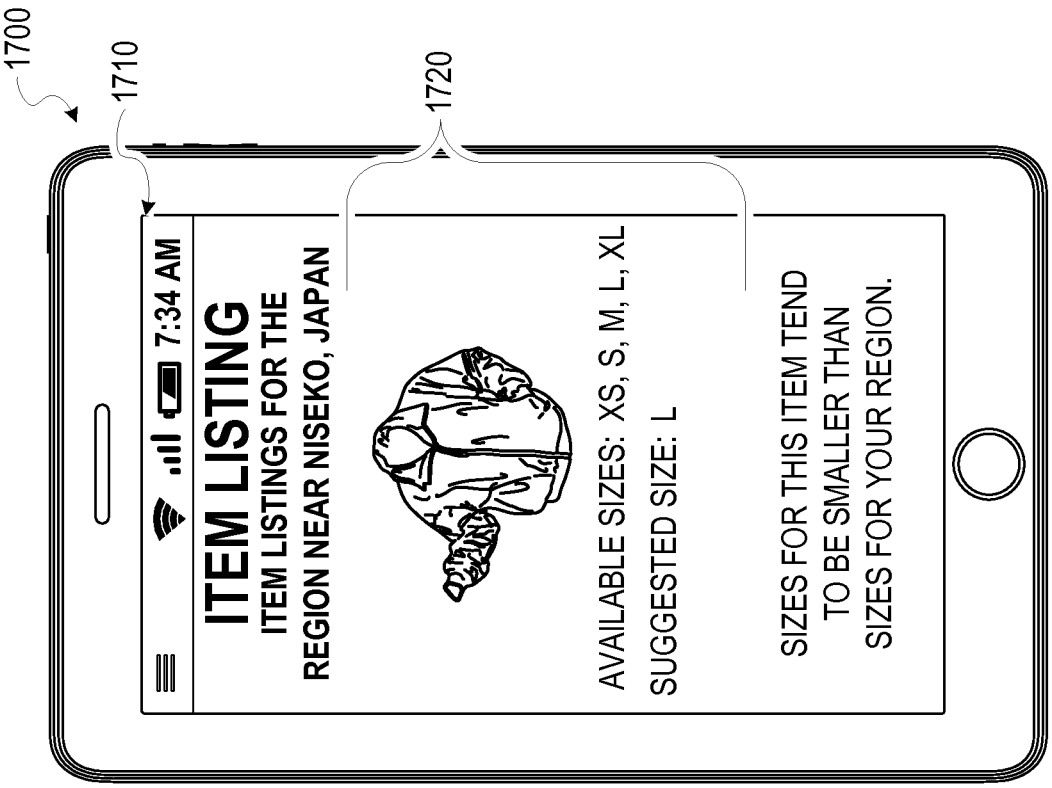
FIG. 17 is a user interface diagram depicting an example user interface showing a candidate size for an item listing, according to some example embodiments.

FIG. 17 is a user interface diagram 1700 depicting an example user interface 1710 showing a candidate size 1720 for a particular item listing. The user interface 1710 can indicate available sizes and the candidate size 1720 that is recommended for the user based on an analysis, for example, of the purchase history of the user and the purchase histories of other users.

Certain embodiments are described herein as including logic or a number of components, modules, or mechanisms. Modules can constitute either software modules (e.g., code embodied on a machine-readable medium or in a transmission signal) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) is configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules are located in a single geographic location (e.g., within a home environment, an office environment, or a server farm). In other example embodiments, the processors or processor-implemented modules are distributed across a number of geographic locations.

Figure 18:
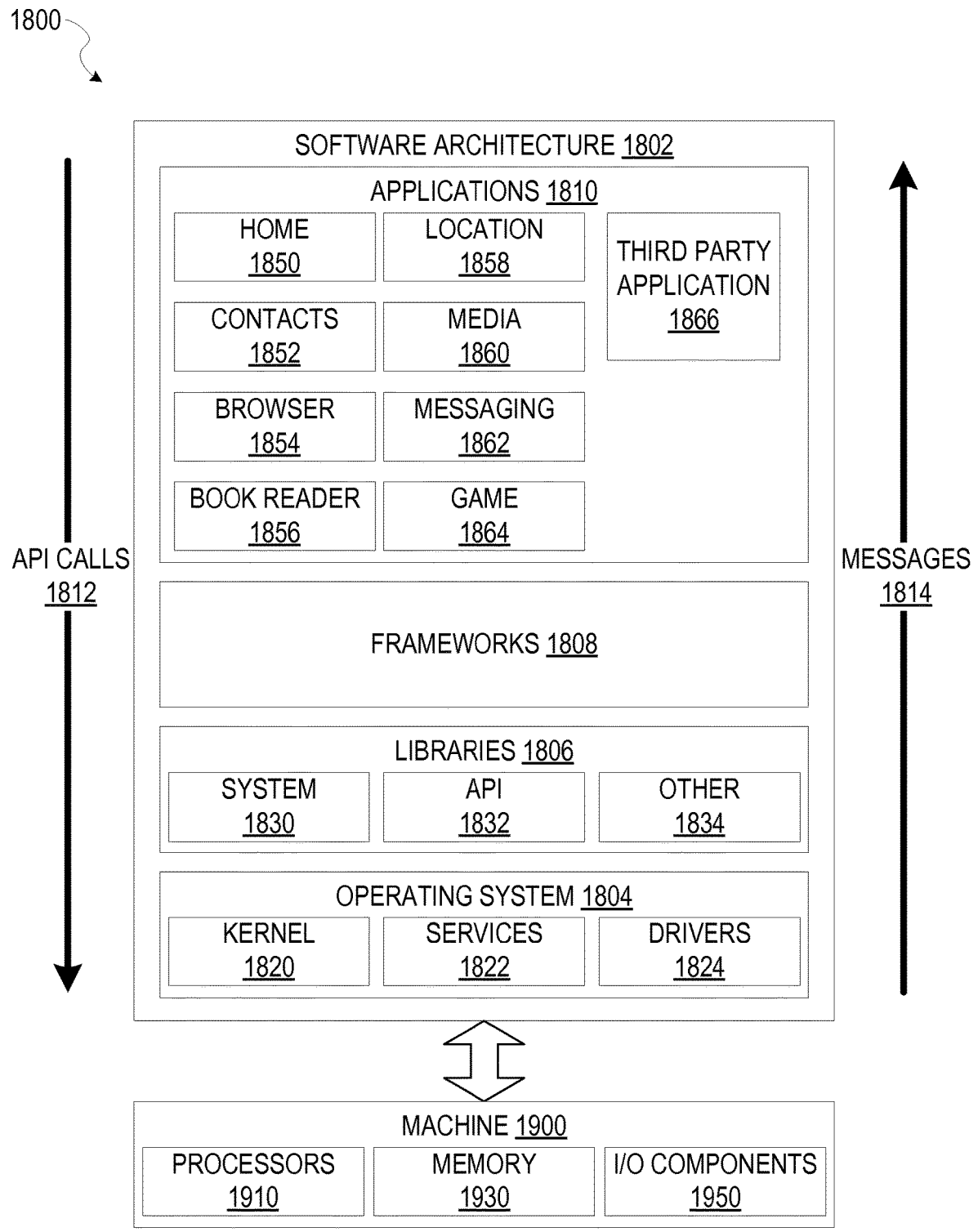
FIG. 18 is a block diagram illustrating an example of a software architecture that may be installed on a machine, according to some example embodiments.

FIG. 18 is a block diagram 1800 illustrating an architecture of software 1802, which can be installed on any one or more of the devices described above. FIG. 18 is merely a non-limiting example of a software architecture, and it will be appreciated that many other architectures can be implemented to facilitate the functionality described herein. In various embodiments, the software 1802 is implemented by hardware such as a machine 1900 of FIG. 19 that includes processors 1910, memory 1930, and I/O components 1950. In this example architecture, the software 1802 can be conceptualized as a stack of layers where each layer may provide a particular functionality. For example, the software 1802 includes layers such as an operating system 1804, libraries 1806, frameworks 1808, and applications 1810. Operationally, the applications 1810 invoke application programming interface (API) calls 1812 through the software stack and receive messages 1814 in response to the API calls 1812, consistent with some embodiments.

In various implementations, the operating system 1804 manages hardware resources and provides common services. The operating system 1804 includes, for example, a kernel 1820, services 1822, and drivers 1824. The kernel 1820 acts as an abstraction layer between the hardware and the other software layers consistent with some embodiments. For example, the kernel 1820 provides memory management, processor management (e.g., scheduling), component management, networking, and security settings, among other functionality. The services 1822 can provide other common services for the other software layers. The drivers 1824 are responsible for controlling or interfacing with the underlying hardware, according to some embodiments. For instance, the drivers 1824 can include display drivers, camera drivers, BLUETOOTH® drivers, flash memory drivers, serial communication drivers (e.g., Universal Serial Bus (USB) drivers), WI-FI® drivers, audio drivers, power management drivers, and so forth.

In some embodiments, the libraries 1806 provide a low-level common infrastructure utilized by the applications 1810. The libraries 1806 can include system libraries 1830 (e.g., C standard library) that can provide functions such as memory allocation functions, string manipulation functions, mathematic functions, and the like. In addition, the libraries 1806 can include API libraries 1832 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 1806 can also include a wide variety of other libraries 1834 to provide many other APIs to the applications 1810.

The frameworks 1808 provide a high-level common infrastructure that can be utilized by the applications 1810, according to some embodiments. For example, the frameworks 1808 provide various graphic user interface (GUI) functions, high-level resource management, high-level location services, and so forth. The frameworks 1808 can provide a broad spectrum of other APIs that can be utilized by the applications 1810, some of which may be specific to a particular operating system or platform.

In an example embodiment, the applications 1810 include a home application 1850, a contacts application 1852, a browser application 1854, a book reader application 1856, a location application 1858, a media application 1860, a messaging application 1862, a game application 1864, and a broad assortment of other applications such as a third party application 1866. According to some embodiments, the applications 1810 are programs that execute functions defined in the programs. Various programming languages can be employed to create one or more of the applications 1810, structured in a variety of manners, such as object-oriented programming languages (e.g., Objective-C, Java, or C++) or procedural programming languages (e.g., C or assembly language). In a specific example, the third party application 1866 (e.g., an application developed using the ANDROID™ or IOS™ software development kit (SDK) by an entity other than the vendor of the particular platform) may be mobile software running on a mobile operating system such as IOS™, ANDROID™, WINDOWS® PHONE, or another mobile operating system. In this example, the third party application 1866 can invoke the API calls 1812 provided by the operating system 1804 to facilitate functionality described herein.

Figure 19:
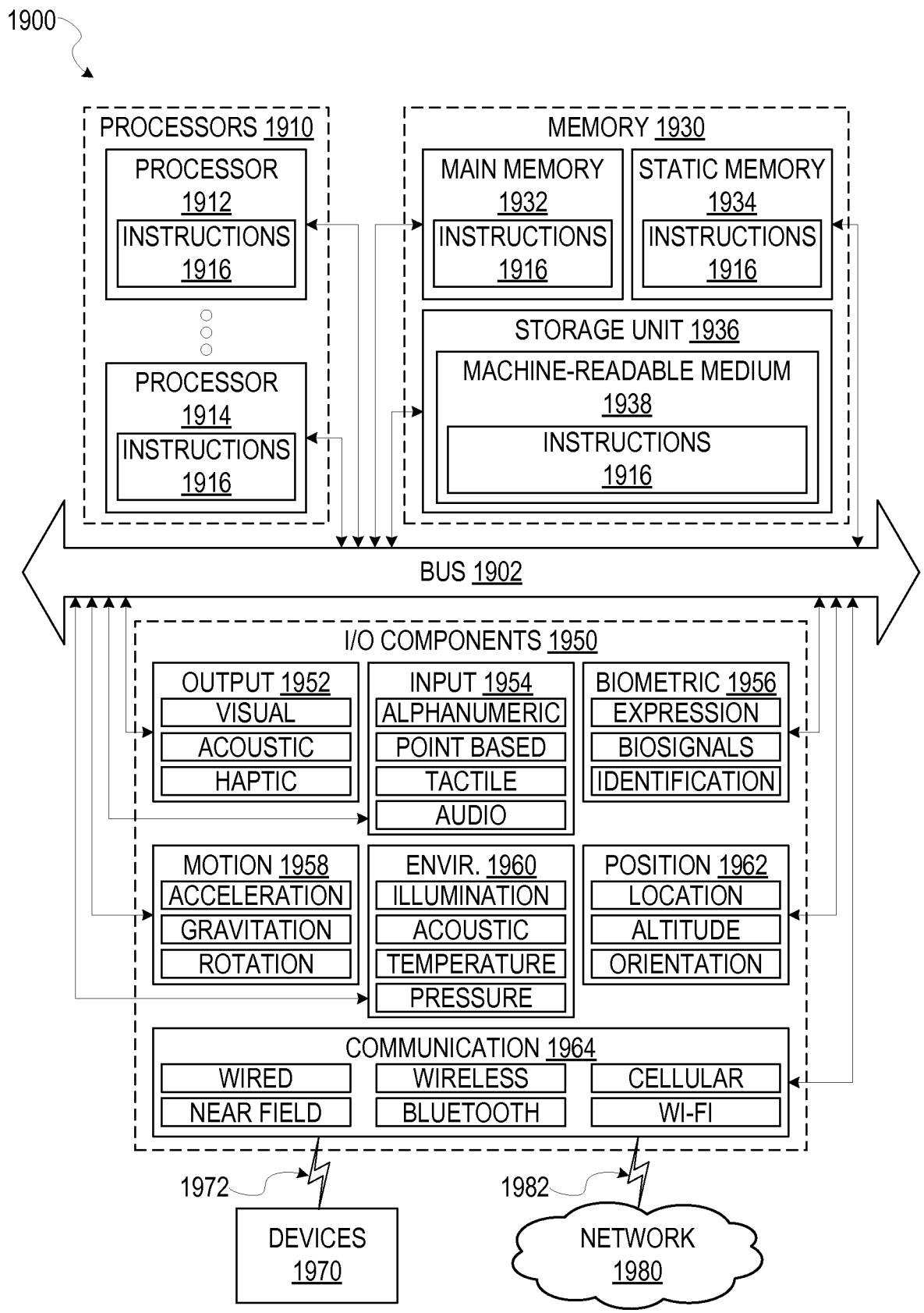
FIG. 19 is a block diagram presenting a diagrammatic representation of a machine in the form of a computer system within which a set of instructions may be executed for causing the machine to perform any one or more of the methodologies discussed herein, according to an example embodiment.

FIG. 19 is a block diagram illustrating components of a machine 1900, according to some embodiments, able to read instructions from a machine-readable medium (e.g., a machine-readable storage medium) and perform any one or more of the methodologies discussed herein. Specifically, FIG. 19 shows a diagrammatic representation of the machine 1900 in the example form of a computer system, within which instructions 1916 (e.g., software, a program, an application, an applet, an app, or other executable code) for causing the machine 1900 to perform any one or more of the methodologies discussed herein can be executed. In alternative embodiments, the machine 1900 operates as a standalone device or can be coupled (e.g., networked) to other machines. In a networked deployment, the machine 1900 may operate in the capacity of a server machine or a client machine in a server-client network environment, or as a peer machine in a peer-to-peer (or distributed) network environment. The machine 1900 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1916, sequentially or otherwise, that specify actions to be taken by the machine 1900. Further, while only a single machine 1900 is illustrated, the term "machine" shall also be taken to include a collection of machines 1900 that individually or jointly execute the instructions 1916 to perform any one or more of the methodologies discussed herein.

In various embodiments, the machine 1900 comprises processors 1910, memory 1930, and I/O components 1950, which can be configured to communicate with each other via a bus 1902. In an example embodiment, the processors 1910 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) include, for example, a processor 1912 and a processor 1914 that may execute the instructions 1916. The term "processor" is intended to include multi-core processors that may comprise two or more independent processors (also referred to as "cores") that can execute instructions contemporaneously. Although FIG. 19 shows multiple processors, the machine 1900 may include a single processor with a single core, a single processor with multiple cores (e.g., a multi-core processor), multiple processors with a single core, multiple processors with multiples cores, or any combination thereof.

The memory 1930 comprises a main memory 1932, a static memory 1934, and a storage unit 1936 accessible to the processors 1910 via the bus 1902, according to some embodiments. The storage unit 1936 can include a machine-readable medium 1938 on which are stored the instructions 1916 embodying any one or more of the methodologies or functions described herein. The instructions 1916 can also reside, completely or at least partially, within the main memory 1932, within the static memory 1934, within at least one of the processors 1910 (e.g., within the processor's cache memory), or any suitable combination thereof, during execution thereof by the machine 1900. Accordingly, in various embodiments, the main memory 1932, the static memory 1934, and the processors 1910 are considered machine-readable media 1938.

As used herein, the term "memory" refers to a machine-readable medium 1938 able to store data temporarily or permanently and may be taken to include, but not be limited to, random-access memory (RAM), read-only memory (ROM), buffer memory, flash memory, and cache memory. While the machine-readable medium 1938 is shown in an example embodiment to be a single medium, the term "machine-readable medium" should be taken to include a single medium or multiple media (e.g., a centralized or distributed database, or associated caches and servers) able to store the instructions 1916. The term "machine-readable medium" shall also be taken to include any medium, or combination of multiple media, that is capable of storing instructions (e.g., instructions 1916) for execution by a machine (e.g., machine 1900), such that the instructions, when executed by one or more processors of the machine 1900 (e.g., processors 1910), cause the machine 1900 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 1950 include a wide variety of components to receive input, provide output, produce output, transmit information, exchange information, capture measurements, and so on. In general, it will be appreciated that the I/O components 1950 can include many other components that are not shown in FIG. 19. The I/O components 1950 are grouped according to functionality merely for simplifying the following discussion, and the grouping is in no way limiting. In various example embodiments, the I/O components 1950 include output components 1952 and input components 1954. The output components 1952 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1954 include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1950 include biometric components 1956, motion components 1958, environmental components 1960, or position components 1962, among a wide array of other components. For example, the biometric components 1956 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1958 include acceleration sensor components (e.g., an accelerometer), gravitation sensor components, rotation sensor components (e.g., a gyroscope), and so forth. The environmental components 1960 include, for example, illumination sensor components (e.g., a photometer), temperature sensor components (e.g., one or more thermometers that detect ambient temperature), humidity sensor components, pressure sensor components (e.g., a barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1962 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1950 may include communication components 1964 operable to couple the machine 1900 to a network 1980 or devices 1970 via a coupling 1982 and a coupling 1972, respectively. For example, the communication components 1964 include a network interface component or another suitable device to interface with the network 1980. In further examples, communication components 1964 include wired communication components, wireless communication components, cellular communication components, Near Field Communication (NFC) components, BLUETOOTH® components (e.g., BLUETOOTH® Low Energy), WI-FI® components, and other communication components to provide communication via other modalities. The devices 1970 may be another machine or any of a wide variety of peripheral devices (e.g., a peripheral device coupled via a Universal Serial Bus (USB)).

Moreover, in some embodiments, the communication components 1964 detect identifiers or include components operable to detect identifiers. For example, the communication components 1964 include Radio Frequency Identification (RFID) tag reader components, NFC smart tag detection components, optical reader components (e.g., an optical sensor to detect one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1964, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 1980 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WI-FI® network, another type of network, or a combination of two or more such networks. For example, the network 1980 or a portion of the network 1980 may include a wireless or cellular network, and the coupling 1982 may be a Code Division Multiple Access (CDMA) connection, a Global System for Mobile communications (GSM) connection, or another type of cellular or wireless coupling. In this example, the coupling 1982 can implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1916 are transmitted or received over the network 1980 using a transmission medium via a network interface device (e.g., a network interface component included in the communication components 1964) and utilizing any one of a number of well-known transfer protocols (e.g., Hypertext Transfer Protocol (HTTP)). Similarly, in other example embodiments, the instructions 1916 are transmitted or received using a transmission medium via the coupling 1972 (e.g., a peer-to-peer coupling) to the devices 1970. The term "transmission medium" shall be taken to include any intangible medium that is capable of storing, encoding, or carrying the instructions 1916 for execution by the machine 1900, and includes digital or analog communications signals or other intangible media to facilitate communication of such software.

Furthermore, the machine-readable medium 1938 is non-transitory (in other words, not having any transitory signals) in that it does not embody a propagating signal. However, labeling the machine-readable medium 1938 "non-transitory" should not be construed to mean that the medium is incapable of movement; the medium should be considered as being transportable from one physical location to another. Additionally, since the machine-readable medium 1938 is tangible, the medium may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer system comprising:
   one or more processors;
   at least one memory storing instructions that, when implemented by the one or more processors, performs operations comprising:
   receiving time data corresponding to a destination geolocation, wherein the time data comprises a time range that a user is scheduled to be in a vicinity of a destination geolocation;
   receiving an indication that the user has purchased an item associated with the destination geolocation;
   determining, based on GPS timing and location information of a user device associated with the user, that the user has traveled to the vicinity of the destination geolocation during the time range;
   determining, based on the time data, a return time from the destination geolocation; and
   based on the return time and the determination that the user has traveled to the vicinity of the destination geolocation, automatically generating a new listing for sale of the item, the new listing being generated to be published at a time determined from the return time.

2. The computer system of claim 1, wherein the return time comprises a time when a user plans to leave a vicinity of the destination geolocation.

3. The computer system of claim 2, wherein the time data is received from a user input on a user interface.

4. The computer system of claim 2, wherein the time data comprises a date from an airline ticket.

5. The computer system of claim 1, wherein the operations further comprise:
   receiving a sale date from a user input on a user interface; and
   publishing, to an online marketplace, the new listing on the sale date.

6. The computer system of claim 1, wherein the item is an apparel item.

7. The computer system of claim 6, wherein the operations further comprise determining that the apparel item was purchased for travel to the destination geolocation based on one or more selected from the following: travel data, one or more characteristics of the apparel item, and the destination geolocation.

8. The computing system of claim 1, wherein the operations further comprise providing the new listing for display on a user interface of a user device.

9. The computing system of claim 1, wherein the new listing comprises information obtained from a previous purchase listing associated with the item.

10. A computer-implemented method comprising:
    receiving, at a processor, time data corresponding to a destination geolocation wherein the time data comprises a time range that a user is scheduled to be in a vicinity of a destination geolocation;
    receiving, at the processor, an indication that the user has purchased an item associated with the destination geolocation;
    determining, based on GPS timing and location information of a user device associated with the user, that the user has traveled to the vicinity of the destination geolocation during the time range;
    determining, by the processor, based on the time data, a return time from the destination geolocation; and
    based on the return time and the determination that the user has traveled to the vicinity of the destination geolocation, automatically generating, by the processor, a new listing for sale of the item, the new listing being generated to be published at a time determined from the return time.

11. The computer-implemented method of claim 10, wherein the return time comprises a time when a user plans to leave a vicinity of the destination geolocation.

12. The computer-implemented method of claim 10, wherein the time data is received from a user input on a user interface.

13. The computer-implemented method of claim 10, wherein the time data comprises a date from an airline ticket.

14. The computer-implemented method of claim 10, wherein the method further comprises:
    receiving a sale date from a user input on a user interface; and
    publishing, to an online marketplace, the new listing on the sale date.

15. The computer-implemented method of claim 10, wherein the new listing comprises information obtained from a previous purchase listing associated with the item.

16. A non-transitory machine-readable medium storing instructions that, when executed by at least one processor of a machine, causes the machine to perform operations comprising:
    receiving time data corresponding to a destination geolocation, wherein the time data comprises a time range that a user is scheduled to be in a vicinity of a destination geolocation;
    receiving an indication that the user has purchased an item associated with the destination geolocation;
    determining, based on GPS timing and location information of a user device associated with the user, that the user has traveled to the vicinity of the destination geolocation during the time range;
    determining based on the time data, a return time from the destination geolocation; and
    based on the return time and the determination that the user has traveled to the vicinity of the destination geolocation, automatically generating a new listing for sale of the item, the new listing being generated to be published at a time determined from the return time.

17. The non-transitory machine-readable medium of claim 16, wherein the return time comprises a time when the user plans to leave a vicinity of the destination geolocation.

18. The non-transitory machine-readable medium of claim 16, wherein the operations further comprise determining, based on one or more of: the travel data, one or more characteristics of the item, and the destination geolocation, that the item was purchased for travel to the destination geolocation.

19. The non-transitory machine-readable medium of claim 16, wherein the operations further comprise:
    receiving a sale date from a user input on a user interface; and publishing, to an online marketplace, the new listing on the sale date.

20. The non-transitory machine-readable medium of claim 16, wherein the new listing comprises information obtained from a previous purchase listing associated with the item.

* * * * *